(12) United States Patent
Bruner

(10) Patent No.: US 11,645,772 B2
(45) Date of Patent: May 9, 2023

(54) MOBILE 3D CROWD SCANNING METHODS AND APPARATUS

(71) Applicant: SIZE STREAM LLC, Cary, NC (US)

(72) Inventor: David Bruner, Cary, NC (US)

(73) Assignee: SIZE STREAM LLC, Cary, NC (US)

( * ) Notice: Subject to any disclaimer, the term of this patent is extended or adjusted under 35 U.S.C. 154(b) by 0 days.

(21) Appl. No.: 17/416,861

(22) PCT Filed: Jul. 24, 2020

(86) PCT No.: PCT/US2020/043547
§ 371 (c)(1),
(2) Date: Jun. 21, 2021

(87) PCT Pub. No.: WO2021/025879
PCT Pub. Date: Feb. 11, 2021

(65) Prior Publication Data
US 2022/0058819 A1    Feb. 24, 2022

Related U.S. Application Data

(60) Provisional application No. 62/884,009, filed on Aug. 7, 2019.

(51) Int. Cl.
*G06T 7/55* (2017.01)
*G06T 17/00* (2006.01)
(Continued)

(52) U.S. Cl.
CPC ............ *G06T 7/55* (2017.01); *G06F 16/5866* (2019.01); *G06T 17/10* (2013.01); *H04N 1/00156* (2013.01); *G06T 2200/08* (2013.01)

(58) Field of Classification Search
None
See application file for complete search history.

(56) References Cited

U.S. PATENT DOCUMENTS 6,577,330 B1 *   6/2003   Tsuda .................. G06F 3/04815
                                                                 715/781
10,453,216 B1 *  10/2019  Zelenskiy ............ G06V 10/225
(Continued)

FOREIGN PATENT DOCUMENTS

WO        2015192117 A1    12/2015

OTHER PUBLICATIONS

"International Search Report and Written Opinion of the International Searching Authority", International Application No. PCT/US2020/043547, dated Feb. 12, 2021, 11 pp.
(Continued)

*Primary Examiner* — Joni Hsu
(74) *Attorney, Agent, or Firm* — Myers Bigel, P.A.

(57) ABSTRACT

A method of obtaining a 3D model of a subject includes capturing a plurality of images of the subject by an image capture device, associating respective ones of the plurality of images with a timestamp and unique identification number, transmitting image capture data comprising the timestamp and the unique identification number to an external server, receiving a transmission comprising the unique identification number, and, responsive to receiving the transmission, transmitting a first image of the plurality of images that is associated with the unique identification number.

25 Claims, 12 Drawing Sheets

(51) Int. Cl.
*G06F 16/58* (2019.01)
*G06T 17/10* (2006.01)
*H04N 1/00* (2006.01)

(56) References Cited

U.S. PATENT DOCUMENTS

| | | | |
|---|---|---|---|
| 10,665,036 B1* | 5/2020 | Ha | G06F 3/012 |
| 10,692,288 B1* | 6/2020 | Rasmussen | A63F 13/213 |
| 2006/0001744 A1* | 1/2006 | Singh | H04N 5/23203 348/207.99 |
| 2010/0319100 A1 | 12/2010 | Chen et al. | |
| 2013/0066750 A1 | 3/2013 | Siddique et al. | |
| 2013/0346869 A1* | 12/2013 | Asver | G06Q 50/01 715/730 |
| 2014/0100994 A1 | 4/2014 | Tatzel et al. | |
| 2015/0042762 A1* | 2/2015 | Kim | G06T 19/20 348/47 |
| 2016/0065798 A1 | 3/2016 | Evans | |
| 2016/0373493 A1* | 12/2016 | Lee | H04L 67/1044 |
| 2017/0178352 A1* | 6/2017 | Harmsen | G06V 10/42 |
| 2017/0219339 A1* | 8/2017 | Mueller | G01B 11/272 |
| 2017/0332131 A1* | 11/2017 | Opsenica | H04B 10/116 |
| 2017/0365102 A1 | 12/2017 | Huston et al. | |
| 2018/0115683 A1* | 4/2018 | Lee | H04N 5/06 |
| 2018/0143976 A1 | 5/2018 | Huston | |
| 2018/0356213 A1 | 12/2018 | Zheng et al. | |
| 2018/0367739 A1* | 12/2018 | Messely | G08B 13/19667 |
| 2019/0132492 A1 | 5/2019 | Paluri | |
| 2019/0357771 A1* | 11/2019 | Yu | A61N 5/0613 |
| 2021/0152796 A1* | 5/2021 | Boud | G06T 7/74 |

OTHER PUBLICATIONS

"Invitation to Pay Additional Fees and, Where Applicable, Protest Fee", International Application No. PCT/US2020/043547, dated Sep. 16, 2020, 2 pp.

Peng, Fanke, et al., "Improved Fit: Designing 3D Body Scanning Apps for Fashion", 5th International Conference on Mass Customization and Personalization in Central Europe (MCP-CE 2012), Novi Sad, Serbia, Sep. 19, 2021, pp. 180-187.

"Communication with Supplementary European Search Report", EP Application No. 20849212.4, dated Aug. 2, 2022, 11 pp.

* cited by examiner

MOBILE 3D CROWD SCANNING METHODS AND APPARATUS

RELATED APPLICATIONS

This application is a 35 U.S.C. § 371 national stage application of PCT Application No. PCT/US2020/043547, filed on Jul. 24, 2020, which claims the benefit of and priority to U.S. Provisional Patent Application No. 62/884,009 filed Aug. 7, 2019, the disclosures of which are incorporated herein by reference as if set forth in their entireties. The above-referenced PCT International Application was published in the English language as International Publication No. WO 2021/025879 A2 on Feb. 11, 2021.

FIELD OF THE INVENTION

The present invention relates generally to obtaining three-dimensional (3D) models and, more particularly, to apparatus and methods for obtaining 3D models from a plurality of captured images.

BACKGROUND OF THE INVENTION

Three-dimensional (3D) modeling may be used to create a 3D computerized model of a person or object. The computerized model may be used in a number of different applications, such as 3D body analysis (e.g., for determining body measurements), virtual and/or augmented reality, 3D printing, and the like.

A 3D model may be a virtual representation of a person or object as rendered in data. For example, the 3D outline, shape, texture, etc. of the person or object may be rendered into data representing a geometric form capable of being transmitted and/or saved to memory. A 3D model may be defined by a collection of points in 3D space connected by various geometric entities such as triangles, lines, curved surfaces, or the like. One potential way to generate a 3D model of a person or object is via 3D scanning of the object, which may include scanning multiple images (e.g., two-dimensional images) of the person or object from a number of angles.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a method of obtaining a 3D model of a subject includes communicating with a plurality of image capture devices operated by a plurality of users to form a scanning group, communicating with respective ones of the plurality of image capture devices of the scanning group to position the respective ones of the image capture devices around a periphery of the subject, obtaining one or more captured images from respective ones of the image capture devices, and generating the 3D model of the subject from the plurality of captured images.

In some embodiments, communicating with the plurality of image capture devices to form the scanning group includes distributing an electronic invitation to the plurality of image capture devices over a network connection to a common application executing on each of the plurality of image capture devices and processing a user interaction by a respective user of a respective image capture device with the electronic invitation to add the respective image capture device to the scanning group.

In some embodiments, the electronic invitation comprises a Quick Response (QR) code, which is a machine-readable code consisting of an array of black and white squares, for example. Other machine-readable codes may be utilized, also.

In some embodiments, the method further includes initiating a scanning session by sending an electronic notification to members of the scanning group.

In some embodiments, the method further includes performing a time coordination between respective ones of the image capture devices of the scanning group.

In some embodiments, communicating with respective ones of the plurality of image capture devices of the scanning group to position the respective ones of the image capture devices around the periphery of the subject comprises communicating with a common application executing on each of the plurality of image capture devices.

In some embodiments, the method further includes providing directions via the common application for adjustment of the image capture device.

In some embodiments, the adjustment of the image capture device comprises a physical adjustment of the image capture device, and the directions comprise an indication displayed on the image capture device by the common application.

In some embodiments, a first image capture device of the plurality of image capture devices comprises a first operating system, and a second image capture device of the plurality of image capture devices comprises a second operating system, different from the first operating system.

In some embodiments, the method further includes communicating with the plurality of image capture devices to identify a reference point associated with the subject.

In some embodiments, obtaining the one or more captured images from the respective ones of the image capture devices includes receiving a timestamp and a unique identification number from the respective image capture device, and requesting a respective captured image from the respective image capture device based on the timestamp and the unique identification number.

In some embodiments, each of the plurality of image capture devices is independently operated by a respective user of the plurality of users of the scanning group.

According to some embodiments of the present invention, a method of operating an image capture device to capture an image of a subject includes receiving an electronic invitation to join a scanning group, communicating acceptance of the electronic invitation by a user of the image capture device, receiving positioning directions to adjust a position of the image capture device around a periphery of the subject, and transmitting a captured image of the subject to an external server.

In some embodiments, the method further includes receiving notification of a start of a scanning session.

In some embodiments, the method further includes providing time coordination data to the external server.

In some embodiments, transmitting the captured image of the subject to the external server includes transmitting a timestamp and a unique identification number associated with the captured image to the external server, receiving a request from the external server comprising the unique identification number, and responsive to the request comprising the unique identification number, transmitting the captured image to the external server.

In some embodiments, receiving the positioning directions to adjust the position of the image capture device around the periphery of the subject comprises receiving an electronic instruction for an adjustment to the image capture device.

In some embodiments, the adjustment of the image capture device comprises a physical adjustment of the image capture device, and the method further includes displaying an indication on a display of the image capture device.

In some embodiments, the method further includes automatically identifying a location of the subject and/or an angle from the image capture device to the subject.

According to some embodiments of the present invention, a method of obtaining a 3D model of a subject includes receiving first image capture data comprising a first timestamp and a first unique identification number from a first image capture device, wherein the first unique identification number identifies a first captured image, receiving second image capture data comprising a second timestamp and a second unique identification number from a second image capture device, wherein the second unique identification number identifies a second captured image, transmitting the first unique identification number to the first image capture device and the second unique identification number to the second image capture device, responsive to transmitting the first unique identification number, receiving the first captured image from the first image capture device, responsive to transmitting the second unique identification number, receiving the second captured image from the second image capture device, and generating the 3D model of the subject from the first captured image and the second captured image.

In some embodiments, the first image capture data is one of a plurality of image capture data received from the first image capture device and the transmitting of the first unique identification number to the first image capture device is performed responsive to determining that the first timestamp is within a predetermined time interval from the second timestamp.

In some embodiments, the method further includes receiving first position data from the first image capture device and second position data from the second image capture device, and associating the first position data with a first physical location and the second position data with a second physical location, wherein the first and second physical locations are locations around a periphery of the subject.

In some embodiments, the method further includes, responsive to receiving the first position data, transmitting an indication to the first image capture device that the first physical location of the first image capture device should be changed to a third physical location, different from the first physical location.

In some embodiments, the method further includes separating the periphery of the subject into a plurality of segments, associating a first segment of the plurality of segments with the first image capture device based on the first position data, and associating a second segment of the plurality of segments with the second image capture device based on the second position data.

In some embodiments, the plurality of segments are equidistant from one another.

In some embodiments, the method further includes associating the first image capture data with the first segment responsive to receiving the first image capture data from the first image capture device and associating the second image capture data with the second segment responsive to receiving the second image capture data from the second image capture device.

In some embodiments, the transmitting of the first unique identification number to the first image capture device is performed responsive to determining that both of the first segment and the second segment are associated with the first image capture data and the second image capture data, respectively.

In some embodiments, transmitting the first unique identification number to the first image capture device and the second unique identification number to the second image capture device comprising transmitting the first unique identification number to a common application executing on the first image capture device and transmitting the second unique identification number to the common application executing on the second image capture device.

In some embodiments, the method further includes receiving, from the first image capture device, a first 3D coordinate for a physical location corresponding to a reference point on the subject.

In some embodiments, the method further includes transmitting, to the second image capture device, a second 3D coordinate for the physical location corresponding to the reference point on the subject.

In some embodiments, the second 3D coordinate is different than the first 3D coordinate.

In some embodiments, the method further includes transmitting a command to the first image capture device and the second image capture device to stop capturing images.

In some embodiments, the method further includes receiving first time data from the first image capture device, receiving second time data from the second image capture device, and generating common time coordination data for the first image capture device and the second image capture device based on the first time data and the second time data.

In some embodiments, the method further includes adjusting the first timestamp based on the common time coordination data for the first image capture device.

According to some embodiments of the present invention, a method of obtaining a 3D model of a subject includes capturing a plurality of images of the subject by an image capture device, associating respective ones of the plurality of images with a timestamp and unique identification number, transmitting image capture data comprising the timestamp and the unique identification number to an external server, receiving a transmission comprising the unique identification number, and, responsive to receiving the transmission, transmitting a first image of the plurality of images that is associated with the unique identification number.

In some embodiments, transmitting the image capture data comprises transmitting a plurality of timestamps and a plurality of unique identification numbers, each of the plurality of timestamps and the plurality of unique identification numbers respectively associated with ones of the plurality of the images of the subject.

In some embodiments, the method further includes transmitting first position data to the external server, wherein the first position data corresponds to a first physical location of the image capture device around a periphery of the subject.

In some embodiments, the method further includes determining the first position data based on a reference target in proximity to the subject and/or a reference garment of the subject.

In some embodiments, determining the first position data is based on a fiducial marker included in the reference target and/or reference garment.

In some embodiments, the method further includes receiving an indication from the external server that the first physical location of the image capture device should be changed to a second physical location, different from the first physical location.

In some embodiments, the method further includes analyzing a second image of the plurality of images to identify a physical location corresponding to a reference point on the subject, determining a 3D coordinate for the physical location, and transmitting the 3D coordinate to the external server.

In some embodiments, the method further includes electronically receiving an invitation to join a scanning group.

In some embodiments, the invitation comprises a QR code.

According to some embodiments of the present invention, a computer program product for obtaining a 3D model of a subject includes a tangible non-transitory computer readable storage medium comprising computer readable program code embodied in the medium that when executed by at least one processor causes the at least one processor to perform operations comprising the method of any of the embodiments described herein.

According to some embodiments of the present invention, a computing apparatus for obtaining a 3D model of a subject includes a processor and a memory coupled to the processor and storing computer readable program code that when executed by the processor causes the processor to perform operations comprising the method of any of the embodiments described herein.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1A:
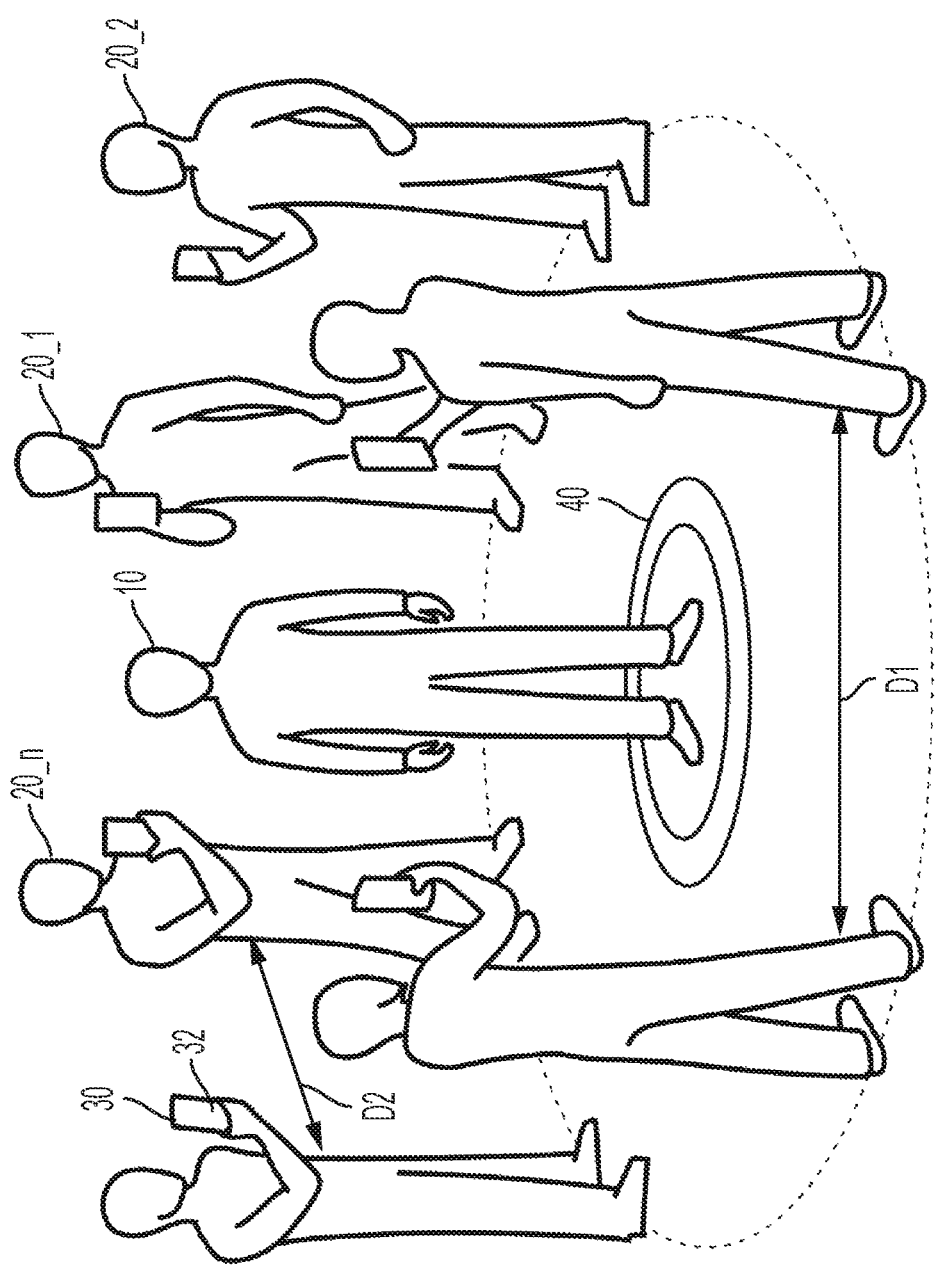
FIG. 1A is a perspective view of an arrangement and apparatus for crowd scanning images for the generation of a 3D model, in accordance with some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

In the figures, certain layers, components, or features may be exaggerated for clarity. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled", or "secured" to another feature or element, it can be directly connected, attached, coupled, or secured to the other feature or element or intervening features or elements may be present. In contrast, when a feature or element is referred to as being "directly connected", "directly attached", "directly coupled", or "directly secured" to another feature or element, there are no intervening features or elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g." (which derives from the Latin phrase "exempli gratia") may be used to introduce or specify a general example or examples of a previously mentioned item, and is not intended to be limiting of such item. The common abbreviation "i.e." (which derives from the Latin phrase "id est") may be used to specify a particular item from a more general recitation.

As used herein, the term "and/or" includes any and all combinations of one or more of the associated listed items and may be abbreviated as "/."

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about," as used herein with respect to a value or number, means that the value or number can vary, for example, by as much as +/−20%.

Embodiments of the present invention improve the technology of photogrammetry. Photogrammetry is the science of making measurements from photographs, especially for recovering the exact positions of surface points. In the simplest example of photogrammetry, the distance between two points that lie on a plane parallel to the photographic image plane can be determined by measuring their distance on the image, if the scale of the image is known. A special case, called stereo-photogrammetry, involves estimating the three-dimensional coordinates of points on an object employing measurements made in two or more two-dimensional photographic images taken from different positions. Common points are identified on each image. A line of sight (or ray) can be constructed from the camera location to the point on the object. It is the intersection of these rays (triangulation) that determines the 3D location of the point. More sophisticated algorithms can exploit other information about a scene that is known a priori, for example symmetries, in some cases allowing reconstructions of 3D coordinates from only one camera position.

Utilizing photogrammetry, a collection of 3D coordinates may be obtained for a given person and/or object from a plurality of photos of that person and/or object. The collection of 3D coordinates may be used to generate a 3D model reconstruction of the person and/or object. Though the description herein will discuss the generation of a 3D model of a person (also referred to as a "subject"), it will be understood that a 3D model may be similarly generated for an object, and the use of a person in the figures and discussion is only for convenience.

As will be understood by one of skill in the art, there are multiple types of 3D models. Some types of 3D models include polygonal models, in which points in 3D space, called vertices, are connected by line segments to form a polygon mesh, curve models, in which surfaces are defined by curves, which are influenced by weighted control points, and/or digital sculpting. Digital sculpting may include, for example, displacement modeling, volumetric modeling, and dynamic tessellation. Displacement modeling may use a dense model (such as that generated by subdivision surfaces of a polygon control mesh) and store new locations for vertex positions of the mesh through use of an image map that stores the adjusted locations. Volumetric modeling may be based on voxels and have similar capabilities as displacement modeling but may have improved polygon stretching capabilities. Dynamic tessellation may divide a surface of the person or object using triangulation to maintain a smooth surface and allow finer details. The above methods are listed only as examples of potential techniques and are not intended to limit the embodiments of the invention.

Conventionally, devices used for photogrammetry are cumbersome and/or expensive. For example, the generation of 3D models may involve dedicated systems configured to precisely determine a position and/or orientation of a subject in order to render its 3D model.

Recently, interest has moved to generating 3D models using personal imaging devices, such as smartphones. A smartphone may capture a plurality of two-dimensional images, which may then be used to generate a 3D model. Conventional techniques utilizing smartphones may involve a person (also referred to herein as the "scanner") holding a smartphone (also referred to herein as an "image capture device") and circumnavigating the person to be scanned (also referred to herein as the "subject"), generating a plurality of 2D images. Such a process may have a number of issues. For example, the process can be time-consuming as the person/scanner that is scanning the subject may need to scan multiple images of the subject, which can require the scanner to walk around the subject. This may require the scanner to maintain a steady camera image for a number of seconds and/or minutes, which may be difficult for the scanner to do. This may cause the field of view of the camera, and thus the positioning of the subject within the field of view, to vary. In addition, during the time it takes for the scanner to scan the subject, the subject may have moved. The movement of the subject may be especially problematic if the subject is, for example, a child or animal.

The potential variance of the field of view, as well as the subject within the field of view, can cause challenges for the photogrammetry methods, which must attempt to adjust for these variances. In some cases, if not enough information is available, gaps and/or distortions may appear in the resulting 3D model of the subject and/or the generation of the 3D model may fail.

Embodiments of the present invention provide improvements in which a group of people distributed around a subject may individually contribute images that may be used to generate a 3D model. Thus, a 3D model may be generated from a plurality of independently-controlled mobile devices. The present invention may provide embodiments in which the group of people, each having an image capture device (e.g., a mobile phone) can substantially simultaneously acquire a plurality of images of a subject. The simultaneous acquisition may solve the problem of the time associated with a single person circumnavigating the subject. In addition, the use of a group of people may allow for a plurality of images of a subject to be captured using only a wireless connection between the individual devices of the crowd (e.g., the mobile phones) without the hard-wired connections that might otherwise be utilized.

Figure 1B:
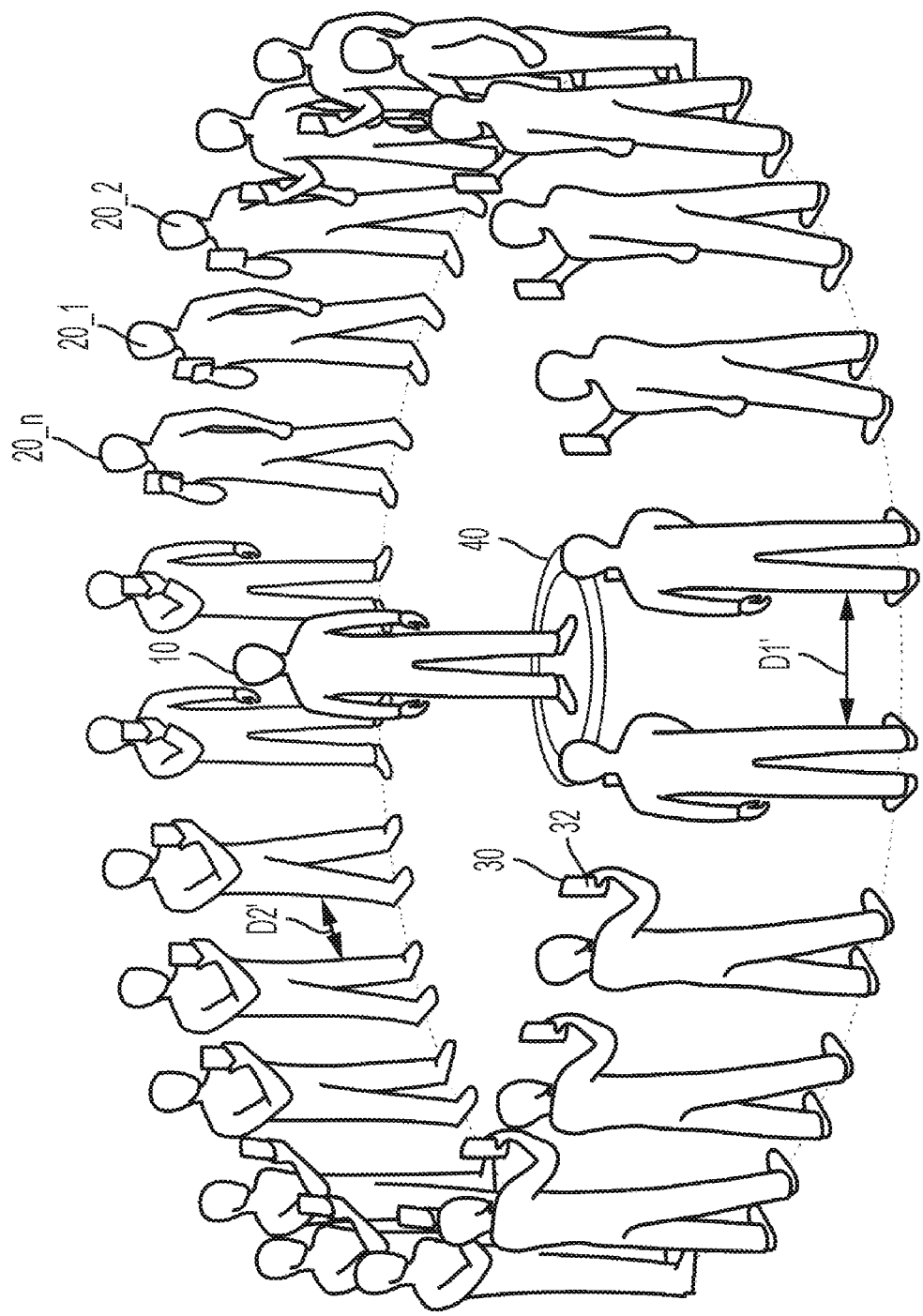
FIG. 1B is a perspective view of an arrangement similar to that of FIG. 1A, with the inclusion of additional scanners, in accordance with some embodiments of the present invention.

FIG. 1A is a perspective view of an arrangement and apparatus for crowd scanning images for the generation of a 3D model, in accordance with some embodiments of the present invention. FIG. 1B is a perspective view of an arrangement similar to that of FIG. 1A, with the inclusion of additional scanners, in accordance with some embodiments of the present invention.

Referring to FIG. 1A, a group of scanners 20_1, 20_2 . . . 20_n (referred to herein collectively and/or individually as scanner(s) 20) may be arranged around a periphery 40 of a subject 10. Respective ones of the scanners 20 may have an image capture device 30. The image capture device 30 may be an electronic device configured to capture an image (e.g., a 2D image) under the control of a user/scanner and/or other automatic electronic control. In some embodiments, the image capture device 30 may be a personal communication device, commonly referred to as a mobile phone and/or a smartphone.

Respective ones of the image capture devices 30 may contain and/or execute a common application (or "app") 32. As used herein, a "common application" refers to an application (e.g., a computer program product) configured to intercommunicate and/or interact with other, similar, applications for a common functionality and/or goal. The term "common" as used in "common application" is not intended to limit the interpretation of the application and is not intended to imply that all copies and/or instantiations of the common application be identical. For example, in some embodiments, a first common application 32 on a first image capture device 30 may differ in some respects from a second common application 32 of a second image capture device 30. For example, the first common application 32 may be a different version of an underlying computer program product than the second common application 32. As another example, the first common application 32 may be configured to operate on a different hardware platform than the second common application 32, such as when the first image capture device 30 and the second image capture device 30 utilize different underlying hardware and/or processors. In such a case, the first common application 32 may be composed of a first set of machine codes selected from a first native instruction set of the first image capture device 30, and the second common application 32 may be composed of a second set of machine codes selected from a second native instruction set of the second image capture device 30.

Using a data synchronization mechanism enabled by the common application 32, a plurality of scanners 20 standing around the subject 10 for a 3D model may capture a 2D image substantially simultaneously (either manually or under automatic control by the common application 32) using their respective image capture devices 30. Those 2D images could then be accumulated and/or processed, such as by photogrammetry processing techniques, to create a 3D model of the subject 10.

Respective ones of the scanners 20 may be separated from other ones of the scanners 20 by a distance D1 and/or D2. For example, some portions of the periphery 40 may have a first subset of the scanners 20 separated by a first distance D1, while other portions of the periphery 40 may have a second subset of the scanners 20 separated by a second distance D2. In FIG. 1A, the scanners 20 are illustrated as being substantially equidistant from one another (e.g., the first distance D1 and the second distance D2 are substantially equal), but the present invention is not limited to such a configuration. In some embodiments, the scanners 20 may be asymmetrically distributed around the periphery 40 of the subject 10. In other words, the first distance D1 and the second distance D2 may not be equal.

Though FIG. 1A illustrates six scanners 20, it will be understood that more (or fewer) scanners 20 may be utilized to generate the 3D model of the subject 10. For example, FIG. 1B illustrates a larger number of scanners 20. As will be understood by one of ordinary skill in the art, as the number of scanners 20 increases, the portion of the periphery 40 around the subject 10 that is scanned by any one scanner 20 may decrease, though the present invention is not limited thereto. For example, in some embodiments, a first distance D1' and/or a second distance D2' between respective ones of the scanners 20 may decrease as the number of participating scanners 20 increases. As discussed with respect to FIG. 1A, the first distance D1' between a first subset of the scanners 20 may be substantially equal or different than a second distance D2' between a second subset of the scanners 20. In some embodiments, the common application 32 may support, for example, twenty or more scanners 20, though the present invention is not limited thereto.

In some embodiments, the respective image capture devices 30 may represent different types and/or quality of image capture devices 30. In some embodiments, a first image capture device 30 of a first scanner 20 may be different than a second image capture device 30 of a second scanner 20. For example, the first image capture device 30 of the first scanner 20 may have a first operating system (e.g., iOS, Android, etc.), a first camera capability (e.g., a camera with a particular number of pixel capture capability, a particular field of view, etc.) and/or a first camera configuration (e.g., a particular camera filter, zoom level, and the like) and the second image capture device 30 of the second scanner 20 may have a second operating system, a second camera capability, and/or a second camera configuration. In some embodiments, the first operating system may be different than the second operating system, the first camera capability may be different than the second camera capability, and/or the first camera configuration may be different than the second camera configuration.

In some embodiments, the common application 32 and/or a computer program product configured to receive data from the common application 32 may be configured to adjust for differences, if present, in the operating system, camera capability, and/or camera configuration of respective ones of the scanners 20. In some embodiments, the differences in the image capture devices 30 of the scanners 20 may provide additional information that may be used to improve the quality of the 3D model that may not be possible with conventional mechanisms utilizing a single camera.

At least one advantage of this approach over, for example, walking around a subject and taking individual pictures is that the capture of the individual images may be done substantially instantly, eliminating and/or reducing the issue of subject movement. In addition, the amount of resources utilized to capture the images of the subject 10, e.g., processing time and/or storage, may be distributed among the respective image capture devices 30, thus reducing the load on any individual image capture device 30. In some embodiments, because any one image capture device 30 may be capturing fewer images and/or capturing images of a smaller amount/area of the subject 10, a quality and/or detail level of the individual images may be increased. The increased quality and/or detail level of the individual images may similarly improve the quality and/or detail of the resulting 3D model that is generated from the images.

The grouping of such a number of people interested in getting scanned may be a common occurrence at gathering locations, such as fitness locations (e.g., yoga studios, fitness gyms, etc.), sports locations (e.g., playing fields, arenas, etc.), social locations (e.g., meetings, parties, concerts, etc.) and the like.

Figure 2:
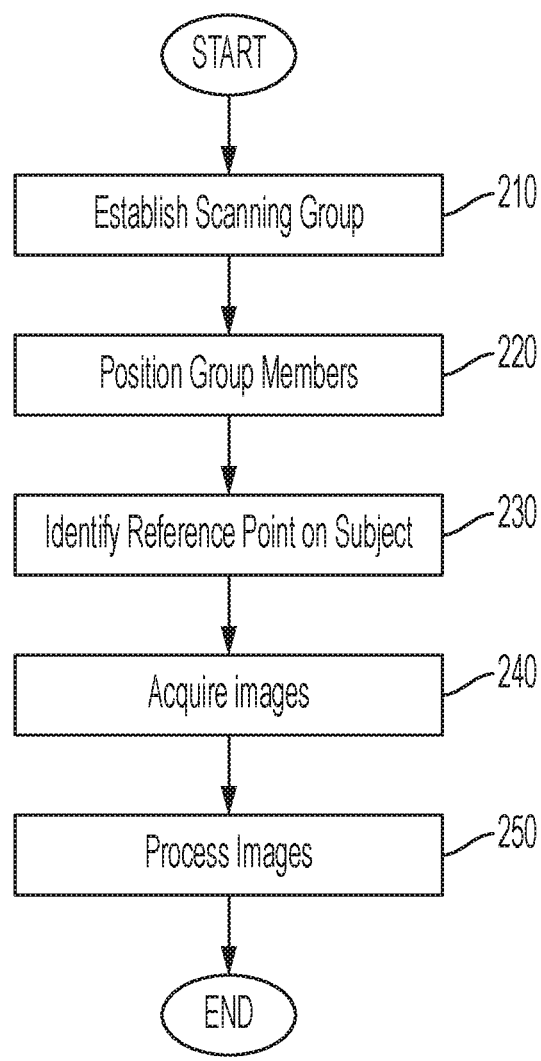
FIG. 2 illustrates operations for crowd scanning a subject, in accordance with some embodiments of the present invention.

FIG. 2 illustrates operations for crowd scanning a subject 10, in accordance with some embodiments of the present invention. FIGS. 2 to 7 will now be used to illustrate methods, systems, and computer program products for generating a 3D model from a plurality of scanners 20, according to embodiments of the present invention. Though the discussion relative to FIGS. 2 to 7 will include descriptions of methods of generating the 3D model, it will be understood that the scope of the present invention includes apparatus, configured by customized software, firmware, and/or hardware, to perform the discussed methods as well as the computer program products utilized to customize the apparatus.

Figure 3:
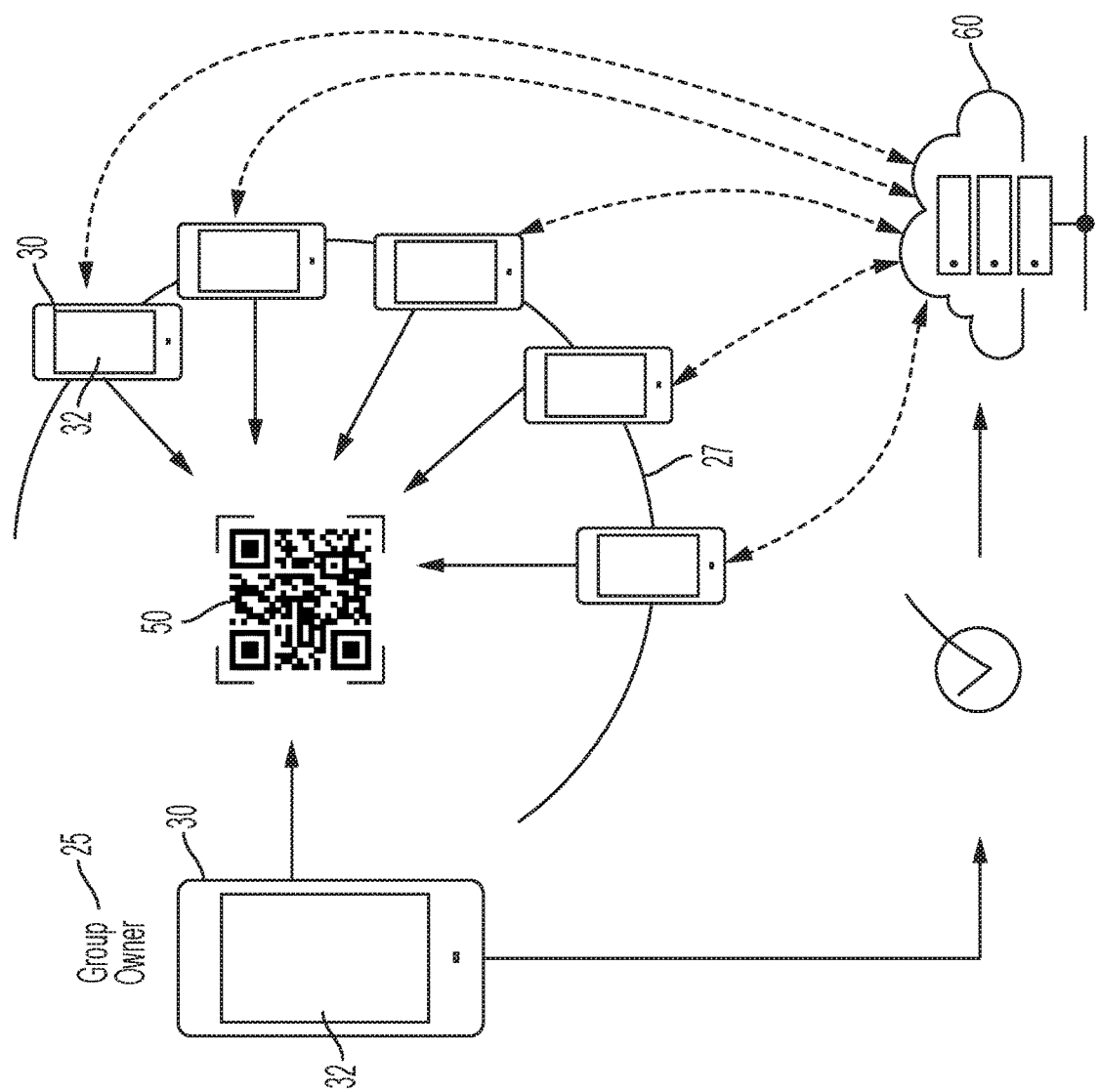
FIG. 3 is a schematic view of a connection stage of a crowd scanning apparatus, computer program product, and/or method, in accordance with some embodiments of the present invention.

Referring now to FIG. 2, methods, systems, and computer program products for crowd scanning may include block 210 to establish a scanning group. In block 210, a connection stage may establish a connection between a plurality of scanners 20 so as to from a group of scanners 20 and associated image capture devices 30 to capture 2D images of a subject 10. FIG. 3 is a schematic view of a connection stage of a crowd scanning apparatus, computer program product, and/or method, in accordance with some embodiments of the present invention.

Referring to FIGS. 2 and 3, in the connection stage, also referred to in the figure as "Stage 0," a plurality of scanners 20 may be connected into a group 27. For example, respective ones of the scanners 20 may activate and/or install the common application 32 on their image capture device 30. In some embodiments, the common application 32 may require the scanner 20 to log into the common application 32. The login may allow the common application 32 to uniquely identify respective ones of the scanners 20.

In some embodiments, a group owner 25 may initiate the creation of a group 27 of scanners 20. The group 27 may be created, for example, by interaction with an external server 60. In some embodiments, the external server 60 may be accessible by respective ones of the scanners 20 via a network connection, including any conventional, public and/or private, real and/or virtual, wired and/or wireless network, including, for example, Bluetooth, Zigbee, and/or the Internet.

In some embodiments, the group 27 may be created, for example, by distributing an invitation to join the group 27 to a plurality of scanners 20. For example, the invitation may be sent via an email, a text message (e.g., SMS), an instant message, a social media posting, etc. In some embodiments, the invitation may be and/or include a QR code 50. Scanning the QR code 50 by the common application 32 or other application on the image capturing device 30 may connect the scanner 20 to the group 27. Though a QR code 50 is illustrated in FIG. 3, it will be understood that other types of machine readable codes and/or bar codes may be used without deviating from the present invention. In addition to the QR code 50, other mechanisms may be used to form the group 27. In some embodiments, the invitation may be and/or include a link to a network resource, such as a Uniform Resource Locator (URL). For example, clicking on the URL by the scanner 20 may result in the scanner 20 being added to the group 27, or to the scanner 20 being directed to a network resource (e.g., a web page) to join the group 27.

FIG. 3 illustrates that the group owner 25 utilizes an image capture device 30 to create the group 27, but the present invention is not limited thereto. In some embodiments, the group owner 25 may utilize a separate computer and/or the external server 60 to create the group 27. In some embodiments, the group owner 25 may also be a member of the group 27, i.e., the group owner 25 may be one of the scanners 20. In some embodiments, the group owner 25 may be a subject 10 of the scan.

Though FIG. 3 illustrates that the creation of the group 27 is instigated by an invitation from the group owner 25, the present invention is not limited thereto. In some embodiments, respective ones of the scanners 20 may request to join the group 27. For example, the scanners 20 may access the external server 60, such as via the common application 32, to access and/or request to join the group 27 (e.g., without an invitation being sent).

Once the group 27 is created, the subject 10 of the scan and/or the group owner 25 may initiate a group session. In some embodiments, the external server 60 may send a notification to members of the group 27 that a group session has been created. For example, in some embodiments, a notification may be presented to the scanner 20 via an interface provided by the common application 32 executing on the image capture device 30 of the scanner 20. In some embodiments, the scanners 20 may then elect to join the group session, though the invention is not limited thereto. In some embodiments, all scanners 20 that are a member of the group 27 may be automatically joined to the group session.

Once the group session has been created, respective ones of the scanners 20 (represented by their individual image capture devices 30 in FIG. 3) may join the group session. In some embodiments, the group session may be displayed and/or represented as a "room" within the common application 32. In some embodiments, creation of the group session may result in a launching of a camera view by the common application 32 and/or connection of the common application 32 to the external server 60. In some embodiments, each of the respective common applications 32 executing on image capture devices 30 of the scanners 20 in the group session may be connected (e.g., over a network) to a single external device. In some embodiments, and in the example illustrated in the figures, the single external device may be the external server 60. However, the present invention is not limited thereto. In some embodiments, the single external device may be the image capture device 30 (or other device) of the group owner 25. In some embodiments, the connection to the external device may be made via, for example, a web connection (e.g., via Hypertext Transfer Protocol (HTTP)) to a web server or other network communication protocol, such as Bluetooth and/or Zigbee, though the present invention is not limited thereto.

Once the respective image capture devices 30 of the scanners 20 in the group session are connected to the external server 60, the image capture devices 30 may synchronize their respective clocks with external server 60. For example, in some embodiments the image capture devices 30 may transmit or otherwise communicate their current clock value (e.g., current clock time) and/or clock setting (e.g., time zone) as time data to the external server 60. In some embodiments, the transmission of the time data by respective ones of the image capture devices 30 may be performed and/or coordinated by the common application 32 executing on the image capture device 30. The external server 60 may collect the time data from the image capture devices 30 and associate the time data with respective ones of the image capture devices 30. By analyzing and comparing the time data of the image capture devices 30 as well as differences between the time data of respective ones of the image capture devices 30, the external server 60 may be configured to establish a common time coordination between the image capture devices 30. The common time coordination may allow the external server 60 to compare time information (e.g., timestamps) received from respective ones of the image capture devices 30 so as to correctly compare a first timestamp received from a first image capture device 30 to a second timestamp received from a second image capture device 30. In some embodiments, the common time coordination may be common time coordination data that indicates a deviation for each of the image capture devices 30 from a common time (e.g., a benchmark clock) and/or the time of the external server 60.

Figure 4:
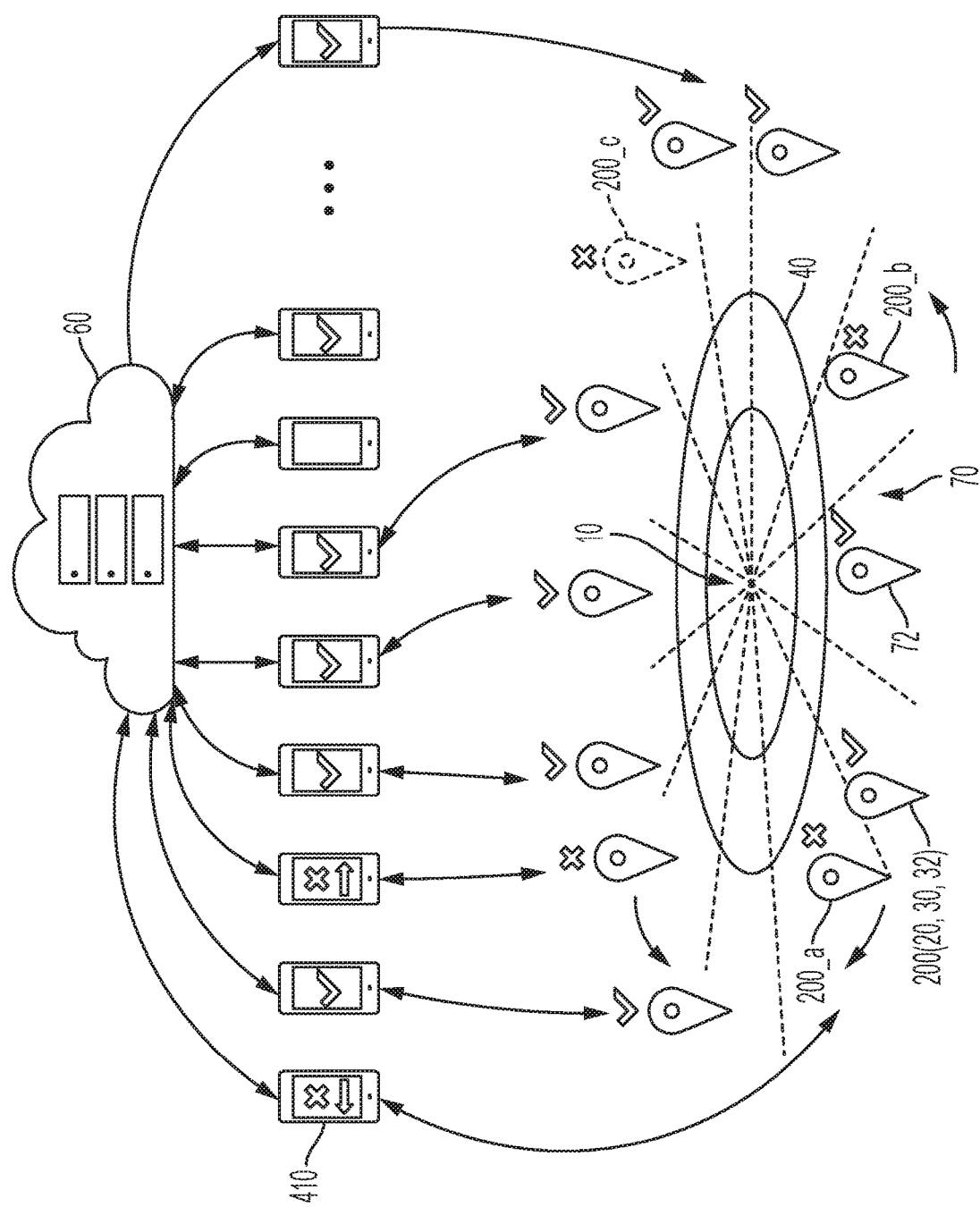
FIG. 4 is a schematic view of a positioning stage of a crowd scanning apparatus, computer program product, and/or method, in accordance with some embodiments of the present invention.

Once the scanning group creation is complete, the operations (see FIG. 2) may continue with block 220 to position individual scanners 20 of the group 27. FIG. 4 is a schematic view of a positioning stage of a crowd scanning apparatus, computer program product, and/or method, in accordance with some embodiments of the present invention. Referring to FIGS. 2 and 4, individual scanners 20 of the group 27 may be positioned around a periphery 40 of the subject 10 in the positioning stage (also referred to as "Stage 1"). Though subject 10 is not illustrated in FIG. 4 for ease of description, a reference designator 10 has been added to FIG. 4 to indicate the position of the subject 10 with respect to the scanners 20.

In addition, to reduce complexity, the positions of the scanners are indicated by reference designator 200, which is intended to designate the combination of the scanner 20 and the image capture device 30, containing the common application 32, of the scanner 20.

The positioning stage may begin with the group owner 25 and/or the subject 10 initiating the acquisition process. In some embodiments, initiation of the acquisition process may be performed through the common application 32. For example, a user selection may be made via the common application 32 to start the application on one of the image capture devices 30 (e.g., the image capture device 30 of the group owner 25 and/or the subject 10). Subsequently a communication may be sent to the common application 32 of the image capture device 30 of respective ones of the scanners 20. In some embodiments, the notifications may be sent by external server 60. In some embodiments, the notifications may be sent directly by the image capture device 30 of the group owner 25 and/or the subject 10.

Once the acquisition process has begun, each of the common applications 32 of respective ones of the scanners 20 may provide an angle (e.g., a position of the respective scanner 20) to the external server 60. For example, the scanner 20 may point the image capture device 30 at the subject 10 and indicate to the common application 32 (e.g., using an interface of the common application 32) the subject 10 to be scanned.

Figure 10A:
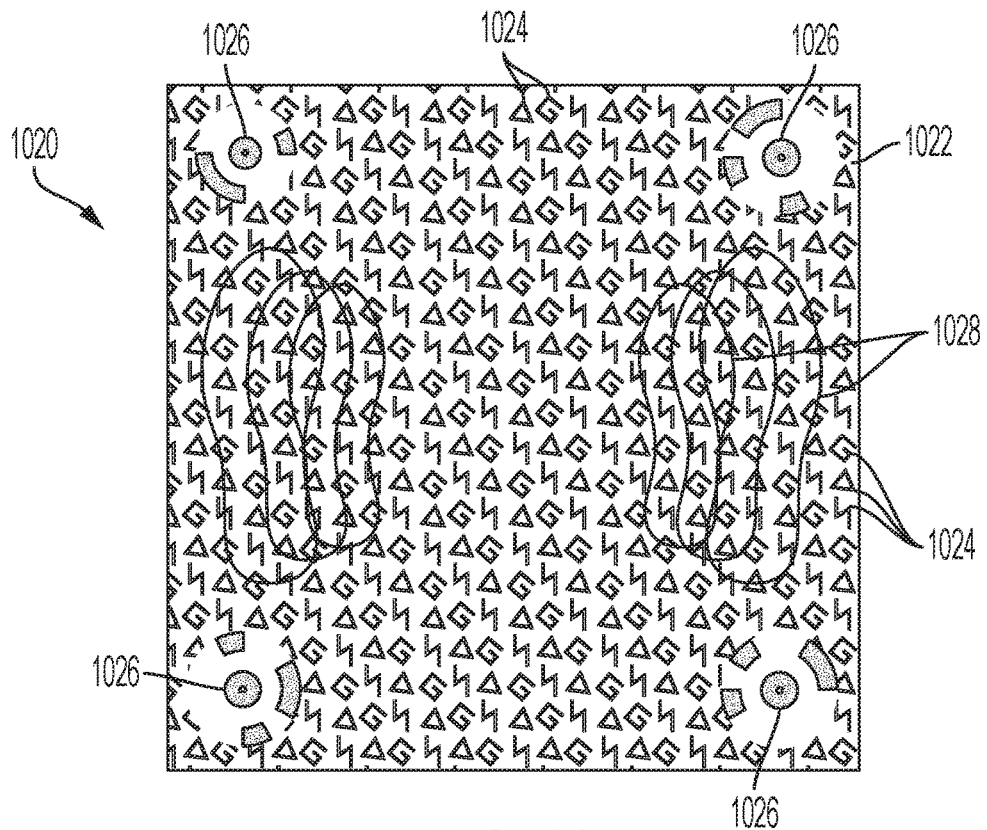
FIGS. 10A-10C illustrate examples of a reference target that may be used to automatically detect a location of the subject, according to various embodiments described herein.
Figure 10B:
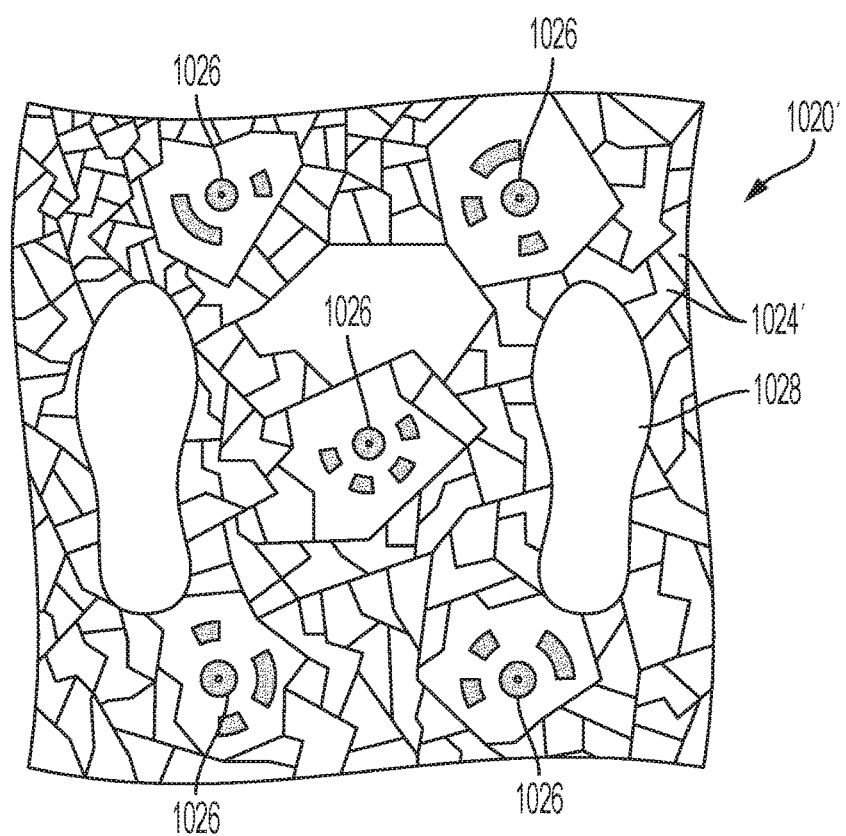
Figure 10C:
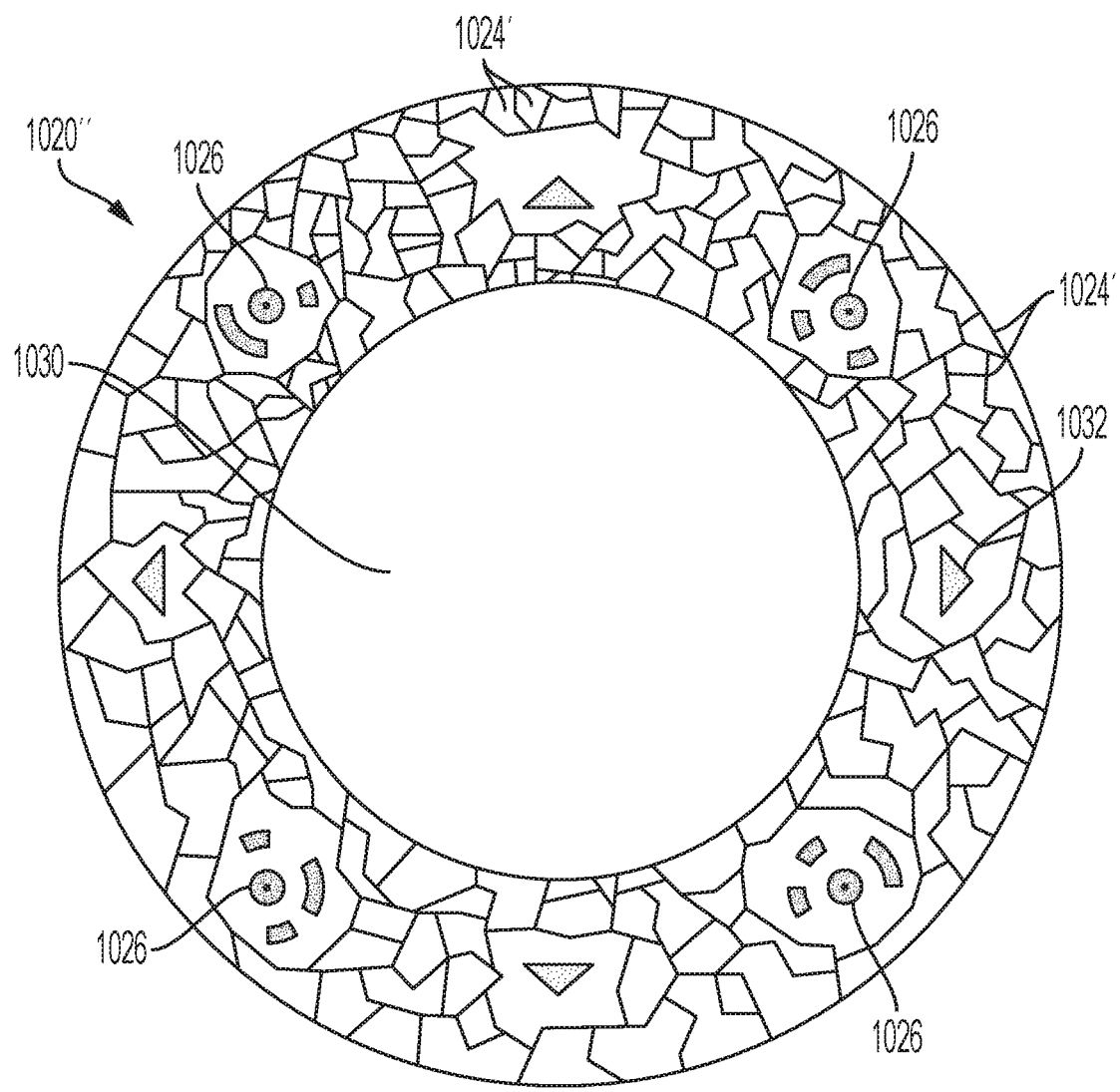

In some embodiments, the common application 32 may be configured to automatically identify a location of the subject 10 and/or an angle from the scanner 20 (or the image capture device 30) to the subject 10. In some embodiments, the common application 32 may be configured to automatically identify a location of the subject 10 based on the position of the subject 10 on or near a reference target. For example, the reference target may be a mat or other object. For example, the subject 10 may be standing on the reference target, and markers on the reference target may be used to assist in identifying the subject 10 and the location of the subject 10 with respect to the scanner 20. FIGS. 10A-10C illustrate examples of a reference target 1020, 1020', 1020" that may be used to automatically detect a location of the subject 10. Embodiments of the present invention, however, do not require the use of a reference target, such as those illustrated in FIGS. 10A-10C.

Referring to FIG. 10A, an example of a reference target 1020 has a generally square or rectangular configuration with a solid background color 1022 and a plurality of randomly arranged fiducials 1024 of different colors than the background color 1022, as shown in FIG. 10A. The fiducials 1024 that make up the illustrated reference target 1020 may include geometric patterns and lines, though the present invention is not limited thereto. The fiducials 1024 may be on a majority of and/or an entire surface of the reference target 1020 so that there are no or few plain and/or blank areas. In some embodiments, it may not be necessary for the subject 10 to stand on the reference target 1020. Standing near or within an opening in the reference target 1020 may be sufficient. Moreover, in some embodiments, the subject 10 may hold the reference target 1020. In some embodiments, as illustrated in FIG. 10A, the reference target 1020 may also include a respective circular fiducial marker 1026 located near each of the corners of the reference target 1020.

The fiducial markers 1024 and circular fiducial markers 1026 may be recognizable by image processing software, which may be provided as part of the common application 32, and may serve as points of reference. The distance between the fiducial markers 1024 and/or fiducial markers 1026, which may be known by the common application 32, may allow the common application 32 to apply the correct scale to an image captured by the image capture device 30 and to the 3D data that is obtained via photogrammetry. In addition, the position of the reference target 1020 on the floor allows the common application 32 to establish a floor ground plane with respect to the subject 10 being measured photogrammetrically.

The reference target 1020 may also include markings 1028 to indicate where the subject 10 should place their feet on the reference target 1020. These markings 1028 may show that the larger the feet of the subject 10, the further their feet should be from each other when standing on the reference target 1020.

FIG. 10B illustrates another floor-placed reference target 1020' according to other embodiments of the present invention. The illustrated reference target 1020' of FIG. 10B includes five fiducial markers 1026 that may be recognizable by the common application 32 and may serve as points of reference. The remaining area of the reference target 1020' may be covered with a plurality of random patterns 1024' which are also photogrammetrically analyzable. As with the reference target 1020 of FIG. 10A, the random patterns 1024' of the reference target 1020' in FIG. 10B may be on a majority of and/or an entire surface of the reference target 1020' between the circular fiducial markers 1026 so that there are no or few plain and/or blank areas.

FIG. 10C illustrates a floor-placed reference target 1020" that has a "ring" configuration and that is cut out or open in the center, according to other embodiments of the present invention. The illustrated reference target 1020" of FIG. 10C is ring-shaped with an inner open region 1030 within which the subject 10 stands. Because the subject 10 is not standing on the reference target 1020", but instead is standing in the cut out or opening 1030, the reference target 1020" may become less wrinkled or otherwise distorted, as may be the case with other reference targets upon which a subject 10 stands.

The illustrated reference target 1020" includes four fiducial markers 1026 that may be recognizable by the common application 32 and that may serve as points of reference. The remaining area of the reference target 1020" may be covered with a plurality of random patterns 1024' that are also photogrammetrically analyzable. As with the reference target 1020' of FIG. 10B the random patterns 1024' of the reference target 1020" in FIG. 10C may be on a majority of and/or an entire surface of the reference target 1020" between the fiducial markers 1026 so that there are no or few plain and/or blank areas. In addition, the illustrated reference target 1020" includes four arrows 1032 pointing in directions that are offset by ninety degrees (90°) from each other. These arrows 1032 may direct the subject 10 to orient the reference target 1020" with respect to the direction the subject 10 is facing when they stand within the ring of the reference target 1020".

The reference targets 1020, 1020', 1020" are examples only and not intended to limit the present invention. It will be recognized that other examples of reference targets incorporating fiducial markers are possible without deviating from the spirit and scope of the present invention. Other reference targets that may be utilized in accordance with embodiments of the present invention may include various shapes having an inner cut out region or opening within which the subject 10 stands. In addition, reference targets that may be utilized in accordance with embodiments of the present invention may be held by the subject 10. Other reference targets that may be utilized in accordance with embodiments of the present invention may include different variations, configurations, and/or types of fiducial markers to aid the common application 32 in determining a location of the subject 10.

Figure 11:
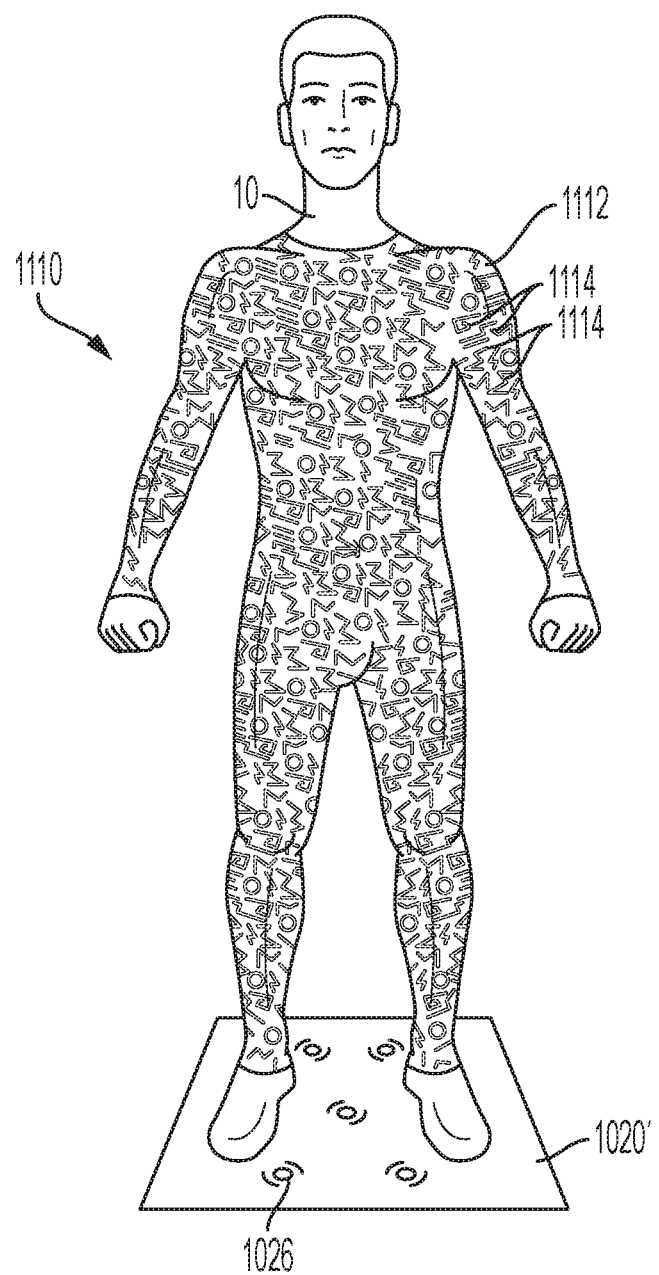
FIG. 11 illustrates an example in which the reference target may be combined with a garment having photogrammetrically analyzable fiducials that is worn by the subject, according to various embodiments described herein.

FIG. 11 illustrates an example in which the reference target 1020, 1020', 1020" may be combined with a reference garment 1110 having photogrammetrically analyzable fiducials 1114 that is worn by the subject 10. This combination may allow a photogrammetric 3D scan to be performed by the common application 32. Embodiments of the present invention, however, do not require the use of such a reference garment.

Referring now to FIG. 11, the subject 10 may be wearing a reference garment 1110 with photogrammetrically analyzable fiducials 1114 and may be standing on a reference target 1020, 1020', 1020" having a plurality of fiducial markers 1026. Although FIG. 11 illustrates the example reference target 1020' of FIG. 10B, it will be recognized that other reference targets are applicable without deviation from the spirit and scope of the present invention.

The reference garment 1110 of FIG. 11 may have a solid background color 1112 and a plurality of randomly arranged fiducials 1114 of a different color than the background color 1112. The fiducials 1114 may be high-contrast marks which are photogrammetrically analyzable by the common application 32. The randomly arranged fiducials 1114 may be on and/or cover a majority of the surface of the reference garment 1110 so that there are no or few plain and/or blank areas. These randomly arranged fiducials 1114 may include lines, squiggles, symbols and geometric patterns, though the present invention is not limited thereto. In some embodiments, all of the fiducials 1114 have the same color and may be clearly distinguishable from the background color 1112. The fiducials 1114 may be applied to the fabric of the reference garment 1110 in various ways, such as by printing, dyeing, weaving, stitching, or otherwise affixing them to the fabric.

The use of the reference garment 1110 may assist the common application 32 in determining a location and/or surface of the subject 10. Though FIG. 11 illustrates the reference garment 1110 being used in combination with the reference target 1020', the present invention is not limited thereto. In some embodiments, the reference target 1020, 1020', 1020" may be omitted and only the reference garment 1110 may be used by the common application 32.

In addition, though it has been described that the common application 32 may automatically identify a location and/or position of the subject 10 utilizing reference targets (e.g., reference target 1020, 1020', 1020") and/or reference garments (e.g., reference garment 1110) incorporating fiducial markers, the present invention is not limited thereto. In some embodiments, the common application 32 may identify the location and/or orientation of the subject 10 by processing images provided by the image capture device 30 utilizing image identification and recognition techniques without requiring that subject 10 be located near a particular reference target or wearing a particular reference garment. For example, the common application 32 may incorporate pattern matching and/or other image recognition algorithms to identify the subject 10 and discern the location of the subject 10 and/or an angle from the scanner 20 to the subject 10.

Referring again to FIG. 4, the common application may determine the location of the subject 10 and/or an angle from the scanner 20 to the subject 10 utilizing techniques described herein and/or other techniques known to those of ordinary skill in the art. For example, the common application 32 may identify the subject 10 within the field of view of the image capture device 30 of the scanner 20. In some embodiments where a reference target (e.g., reference target 1020, 1020', 1020") and/or reference garments (e.g., reference garment 1110) are being used, the common application 32 may analyze an image provided by the image capture device 30 to determine if the subject 10 (and/or the reference target/garment) is within the frame (e.g., the field of view) of the image capture device 30. If the common application 32 determines that the subject 10 (and/or the reference target/garment) is not within the frame, the common application 32 may provide a notification to the scanner 20 to reposition the image capture device 30. The notification may be in the form of direction indications on a user interface of the common application 32 that indicate to the scanner 20 which direction the image capture device 30 (and/or the scanner 20) should be moved. The common application 32 may maintain the notification until the common application 32 determines that the subject 10 (and/or the reference target/garment) is within the frame of the image capture device 30.

In some embodiments, the common application 32 may identify the subject 10 as well as a periphery 40 of the subject 10. The common application 32 may divide the periphery 40 of the subject 10 into a plurality of segments 70. In some embodiments, the common application 32 may indicate to the scanner 20 a physical location 72 within a segment 70 at which the scanner 20 should be positioned.

In some embodiments, the identification of the physical location 72 of the scanner 20 may be coordinated with other ones of the scanners 20, e.g., via the external server 60. For example, individual ones of the common applications 32 may communicate to the external server 60 a general location of the scanner 20 and/or an orientation of the scanner 20 with respect to the subject 10. The external server 60 may divide the periphery 40 of the subject 10 into a plurality of segments 70. In some embodiments, the external server 60 may assign respective ones of the segments 70 to different ones of the scanners 20. In some embodiments, the external server 60 may communicate the assigned segment 70 to the common application 32 of the scanner 20. The common application 32 may then indicate to the scanner 20 (e.g., via an interface of the common application 32), the physical location 72 and/or the segment 70 at which the scanner 20 should be positioned.

In some embodiments, the segments 70 may be configured so as to be equally spaced around the periphery 40 of the subject 10, but the present invention is not limited thereto. In some embodiments, respective ones of the segments 70 and/or physical locations 72 may be asymmetrically sized from other ones of the segments 70 and/or physical locations 72.

Though the discussion herein has discussed the assignment of and/or positioning within segments 70 around the subject 10, the present invention is not limited thereto. In some embodiments, the common application 32 may be configured to position the scanner 20 with respect to the scanner's present position, without moving the scanner 20 (i.e., by moving the image capture device 30).

Once positioned, the common application 32 may transmit the physical location 72 to the external server 60 as position data 410. In some embodiments, the position data 410 may include absolute position data and/or position data relative to the subject 10 (e.g., an angle and/or distance). In some embodiments, the position data 410 may be determined by the common application 32 using a positioning circuit (e.g., a GPS circuit) of the image capture device 30. In some embodiments, the position data 410 may be determined by the common application 32 by analyzing a reference target and/or reference garment (such as those illustrated in FIGS. 10A-11) worn or in proximity to the subject 10.

In some embodiments, the common application 32 may provide a notification and/or warning if the scanner 20 is not positioned correctly with respect to the subject 10. For example, the scanner 20 may point a respective image capture device 30 at the subject 10. The common application 32 may determine (e.g., via a camera image of the image capture device 30) that the subject 10 is not in the center of a frame of the image capture device 30 and/or otherwise misaligned with respect to the subject 10. In some embodiments, the common application 32 may maintain the notification and/or warning until the underlying alignment condition is corrected.

The external server 60 may wait until a plurality of common applications 32 have reported position data 410. In some embodiments, the external server 60 may wait until all of the common applications 32 corresponding to all of the scanners 20 of scanning group 27 have reported position data 410, but the present invention is not limited thereto. In some embodiments, the external server 60 may wait until a predetermined threshold of common applications 32 have reported and/or until the received position data 410 indicates that a satisfactory (e.g., meeting a predetermined threshold) amount of the periphery 40 of the subject 10 is covered by the reporting common applications 32.

The external server 60 may analyze the position data 410 to determine if the respective scanners 20 are correctly positioned. In some embodiments, the external server 60 may transmit requested adjustments to common applications 32 associated with scanners 20 that are not correctly and/or preferably positioned. The adjustments may include directions for physical adjustment of the scanner 20 (e.g., movement left, right, forward, and/or backward) and/or directions for adjustment of the image capture device 30 (e.g., adjustment of a positioning of the image capture device 30, adjustment of a capability of the image capture device 30, and/or adjustment of configuration of the image capture device 30).

In some embodiments, the common application 32 may receive the directions for physical adjustment from the external server 60 and display an indication to the scanner 20. For example, as indicated by designators 200_a and 200_b in FIG. 4, the common application 32 may indicate to the scanner 20 that the scanner 20 should physically move (e.g., left or right) so as to be more correctly positioned within the segment 70. This may be displayed to the scanner 20, for example, as a visible arrow pointing in the direction to be moved within an interface of the common application 32.

In some embodiments, the directions for physical adjustment may be performed automatically by the image capture device 30. For example, the external server 60 may indicate to the common application 32 that a physical configuration (e.g., a zoom level) of the image capture device 30 should be changed. In some embodiments, the common application 32 may cause this adjustment to the physical configuration to be performed automatically without the intervention of the scanner 20.

In some embodiments, the external server 60 may periodically receive updated position data 410. For example, updated position data 410 may be transmitted to the external server 60 responsive to the scanner 20 changing position (e.g., in response to notifications from the common application 32). The external server 60 may continually and/or periodically scan the position data 410 to determine if a sufficient number of scanners 20 are positioned for a scan. Responsive to determining that the number of scanners 20 that are correctly positioned meets the predetermined threshold, the external server 60 may send a notification to each of the common applications 32 that the position of the corresponding scanner 20 is correct. In some embodiments, the common application 32 may indicate (e.g., via a visual and/or audio interface) that the scanner 20 is correctly positioned.

In some embodiments, it may not be possible to correctly position all of the scanners 20. For example, as illustrated by designator 200_c, the external server 60 may determine that a particular scanner 20 may not be capable of being correctly positioned. This may be, for example, because of a physical obstruction, an anomaly in the communication with the common application 32 of the scanner 20, and/or because of a limitation of the image capture device 30. In some embodiments, the external server 60 may indicate to the common application 32 that they are not participating in the scanning session, and the common application 32 may indicate the same to the scanner 20. In some embodiments, responsive to determining that a scanner 20 cannot participate in the scan, the external server 60 may assign another scanner 20 to the affected segment 70, omit the affected segment 70 from the scan, and/or otherwise compensate for the affected segment 70, such as by moving the scanners 20 associated with the segments 70 that are adjacent the affected segment 70.

Figure 5:
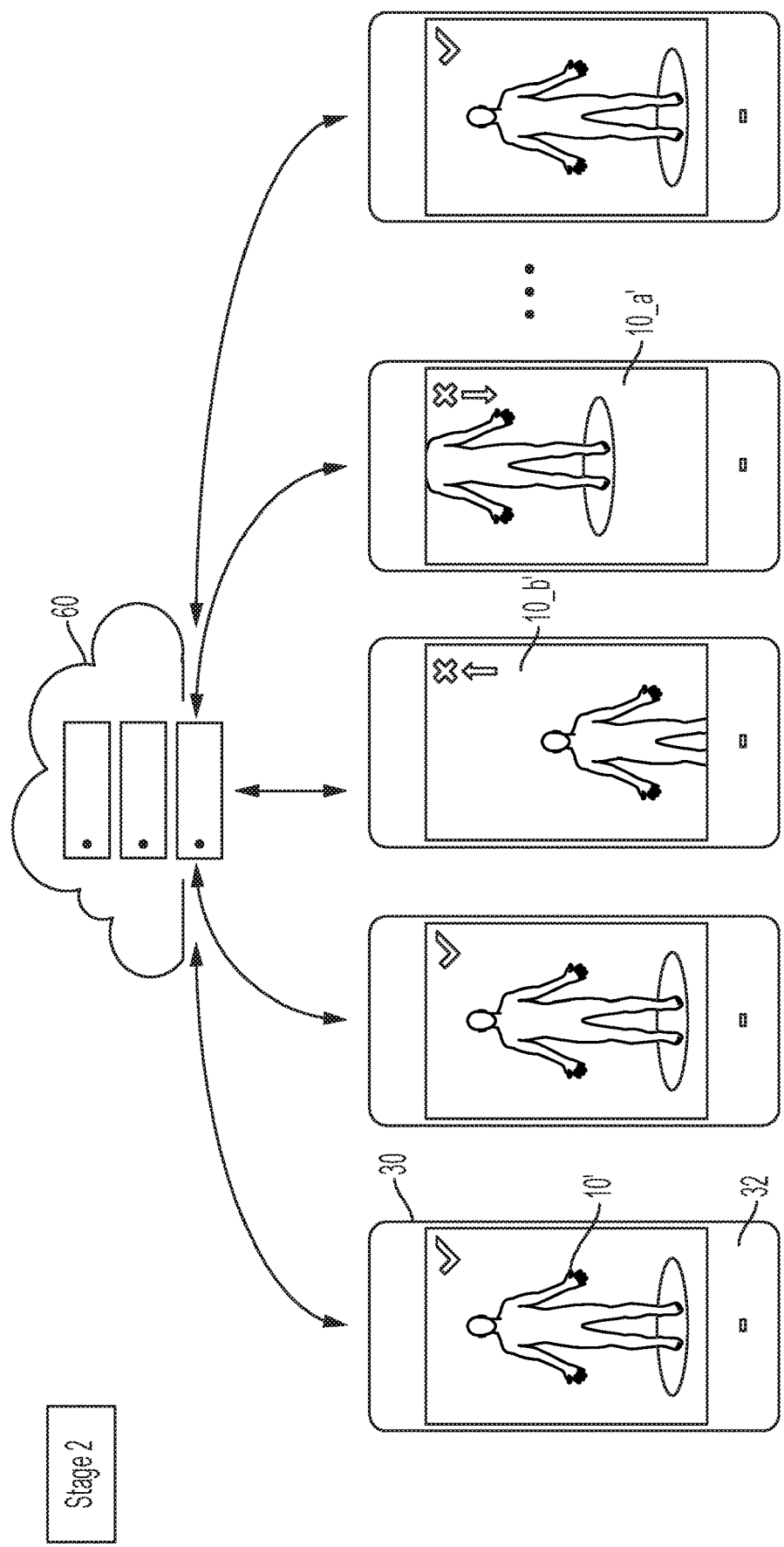
FIG. 5 is a schematic view of a tracking stage of a crowd scanning apparatus, computer program product, and/or method, in accordance with some embodiments of the present invention.

Once the scanners 20 are positioned, the operations (see FIG. 2) may continue with block 230 to identify a reference point on the subject 10. FIG. 5 is a schematic view of a tracking stage of a crowd scanning apparatus, computer program product, and/or method, in accordance with some embodiments of the present invention. Referring to FIGS. 2 and 5, the common applications 32 of the individual scanners 20 may attempt to identify a position of a particular point (e.g., a head) of the subject 10 (also referred to as "Stage 2").

Each common application 32 associated with each of the scanners 20 participating in the scan may review a subject capture 10' of the subject 10. For example, the subject capture 10' may be a virtual image of the subject 10 captured by the image capture device 30. The common application 32 may analyze the subject capture 10' to identify a known reference point on the subject 10. In some embodiments, the known reference point may be a head, or a portion of the head (e.g., a nose) of the subject 10, but the present invention is not limited thereto. The common application 32 may attempt to determine a location of the known reference point within the subject capture 10'. For example, in some embodiments the common application 32 may use known image analysis and identification techniques to find the known reference point (e.g., the head) of the subject 10 within the subject capture 10'. In embodiments in which a reference target and or reference garment (such as those discussed herein with respect to FIGS. 10A-11) are used, the common application may use the reference target and or reference garment to determine the location of the known reference point within the subject capture 10'. For example, fiducial markings of the reference target and or reference garment may be used to orient the subject 10 within 3D space such that image recognition algorithms of the common application 32 can identify the known reference point.

Each common application 32 that is able to identify the known reference point within the subject capture 10' will subsequently determine the physical location of that point and transmit the physical location to the external server 60. For example, the common application 32 will use known photogrammetry techniques to determine a 3D coordinate for the known reference point. For example, the 3D coordinate may be an X, Y, and/or Z location of the known reference point.

The external server 60 will collect each of the physical locations from each of the common applications 32 for the known reference point for analysis. For example, the external server 60 may perform a statistical analysis on each of the provided physical locations to determine a reference point location. In some embodiments, the statistical analysis may include determining a highest probability of the reference point location from among the provided physical locations, which may involve discarding and/or reducing the importance of ones of the provided physical locations that are outliers.

Once the external server 60 has determined the reference point location, the external server 60 may transmit the reference point location back to each of the common applications 32 associated with the scanners 20. The common applications 32 will update their information with the determined reference point location, and use the received reference point location to position the known reference point on the subject capture 10'.

It will be understood that, for some of the common applications 32, a view of the known reference point may not be available. For example, if the known reference point is a head and the head is not in the image (see subject capture 10_a'), the common application 32 may provide an indication that the image capture device 30 should be moved. The determined reference point from the external server 60 may also enable the common application 32 to more accurately analyze the subject capture 10'. For example, based on the transmitted reference point location, the common application 32 may determine that the subject 10 may be better captured if the image capture device 30 was moved (see subject capture 10_b'), and the common application 32 may present a corresponding indication to the scanner 20.

Figure 6:
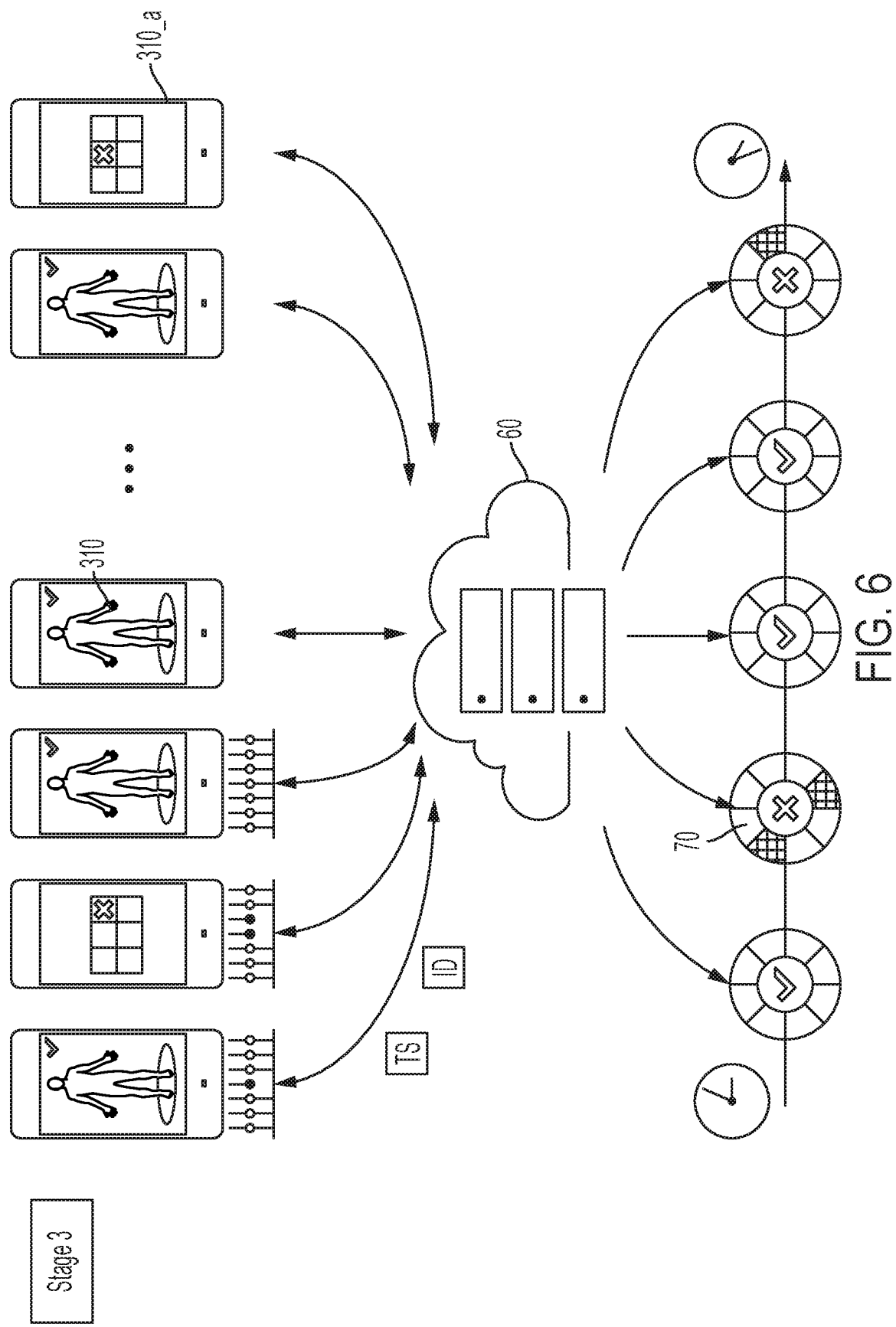
FIG. 6 is a schematic view of an acquisition stage of a crowd scanning apparatus, computer program product, and/or method, in accordance with some embodiments of the present invention.

At the conclusion of the acquisition stage, each of common applications 32 may have a known reference point for the subject 10 with respect to the image capture device 30 associated with the common application 32. Once the reference point on the subject 10 is acquired, the operations (see FIG. 2) may continue with block 240 to acquire images of the subject 10. FIG. 6 is a schematic view of an acquisition stage of a crowd scanning apparatus, computer program product, and/or method, in accordance with some embodiments of the present invention. Referring to FIGS. 2 and 6, the image capture devices 30 of the scanners 20 may begin active acquisition of images of the subject 10 (also referred to as "Stage 3").

During the acquisition stage, each of the image capture devices 30 of the scanners 20 involved in the scan of the subject 10 may continuously capture images 310 of the subject 10. The capture of the images 310 may be directed by the common application 32. In some embodiments, the images 310 may be captured multiple times per second.

The common application 32 may analyze each of the captured images 310 to determine if a successful capture of the subject 10 has been achieved. For example, the common application 32 may analyze the images 310 to determine if they are in focus, adequately capture the subject 10, have enough light, etc. If the image 310 is determined to be successful, the image 310 may be stored locally in storage (e.g., volatile or non-volatile memory of the image capture device 30) along with a timestamp TS of when the image 310 was captured. In some embodiments, the common application 32 may be configured to save a predetermined number (e.g., N, a natural number) of images 310 (and associated timestamps TS) in storage before deleting the images 310.

After an image 310 is determined to be successful, the associated timestamp TS for the image 310 and/or a unique identification number ID for the image 310 may be transmitted to the external server 60 as image capture data. In some embodiments, the unique identification number ID may uniquely identify the image 310 from other ones of the images 310 on the image capture device 30. In some embodiments, the unique identification number ID may also uniquely identify the image capture device 30. Though illustrated as separate elements in FIG. 6, it will be understood that, in some embodiments, the timestamp TS and the unique identification number ID may be consolidated into a same number and/or data structure.

The external server 60 may receive the associated timestamp TS and the unique identification number ID from the common application 32 and may associate this received data with a particular segment 70 and/or physical location 72 around the periphery 40 of the subject 10 (see FIG. 4). For example, the external server 60 may have associated the common application 32, and/or its unique identification number ID, with the particular segment 70 and/or physical location during the positioning stage (block 220 of FIG. 2 and FIG. 4). When a timestamp TS and/or unique identification number ID associated with a particular segment 70 and/or physical location 72 is received, the external server 60 may mark or otherwise determine that the particular segment 70 and/or physical location 72 is accounted for and continue receiving additional timestamps TS and/or unique identification numbers ID for other segments.

In some embodiments, the external server 60 may adjust the timestamp TS received from the image capture device 30 to accommodate the common time coordination previously determined for each image capture device 30. Adjusting the timestamp TS using the common time coordination may allow for the timestamps TS received from different image capture devices 30 to be accurately compared. In some embodiments, the external server 60 may adjust the timestamp TS relative to a time of the external server 60. For example, if the external server 60 determined during the configuration of the common time coordination that a first image capture device 30 operates with a clock (e.g., a time local to the first image capture device 30) that is one second behind the clock of the external server 60, the external server 60 may add one second to each timestamp TS received from the first image capture device 30. Similarly, if the external server 60 determined during the configuration of the common time coordination that a second image capture device 30 operates with a clock that is one second ahead of the clock of the external server 60, the external server 60 may subtract one second to each timestamp TS received from the second image capture device 30. The provided example for coordinating timestamps TS between disparate devices is only an example and is not intended to be limiting of the present invention.

The external server 60 may continue receiving timestamps TS and/or unique identification numbers ID until all of the segments 70 and/or physical locations 72 have been successfully associated with a received timestamp TS and/or unique identification number ID. When a timestamp TS and/or unique identification number ID has been received for the entirety of the periphery 40 of the subject 10, the external server 60 may determine that the active image acquisition may stop.

In some embodiments, the capture of the images may be additionally bounded by time. For example, upon receipt of the timestamp TS, the external server 60 may mark or otherwise associate the segment 70 and/or physical location 72 that has been received with the timestamp TS. The external server 60 may continue to collect timestamps TS from each of the common applications 32 until there exists a time range smaller than a predetermined number of T seconds (where T is a positive number) in which a timestamp TS from every common application 32 (e.g., every scanner 20) and/or every segment 70 was received. As previously described, the analysis of the received timestamps TS may incorporate adjustments based on the determined common time coordination between respective image capture devices 30.

For example, the external server 60 may receive a first timestamp TS from a first common application 32, but may not receive additional timestamps TS from the rest of the common applications 32 until after a time period of T seconds has passed. Accordingly, the external server 60 may discard the first timestamp TS from the first common application 32 in favor of a second timestamp TS from the first common application 32 whose timestamp indicates that it was captured within T seconds of the rest of the common applications 32.

If, during the image acquisition phase, the external server 60 detects one of the common applications 32 has not provided results, such as that indicated by image 310_a in FIG. 6, the external server 60 may send a notification to the associated scanner 20 (e.g., via the common application 32) and/or to the group owner 25. In some embodiments, the failure to receive the timestamps TS and/or unique identification numbers ID may be due to a network connection failure, an algorithmic issue, and/or other cause. In the event of such a failure, the external server 60 may, for example, abort the scan and/or attempt to compensate for the missing regions using other ones of the images 310 from adjacent scanners 20.

When the scan is complete, the external server 60 may send an indication to each of the common applications 32 involved in the scan and/or the group owner 25. Responsive to receiving the indication, the common application 32 may generate a notification to the scanner 20 (e.g., via an interface of the image capture device 30) that the scan is complete.

Though the description herein with respect to FIG. 6 describes the selection/association of a single timestamp TS and/or unique identification number ID with a particular segment 70 and/or physical location 72, it will be understood that other implementations are possible. For example, in some embodiments, multiple timestamps TS and/or unique identification numbers ID may be selected for a particular image capture device 30. For example, all timestamps TS and/or unique identification numbers ID received from the common application 32 of the image capture device 30 may be saved, for later retrieval and/or use during the 3D model generation.

Figure 7:
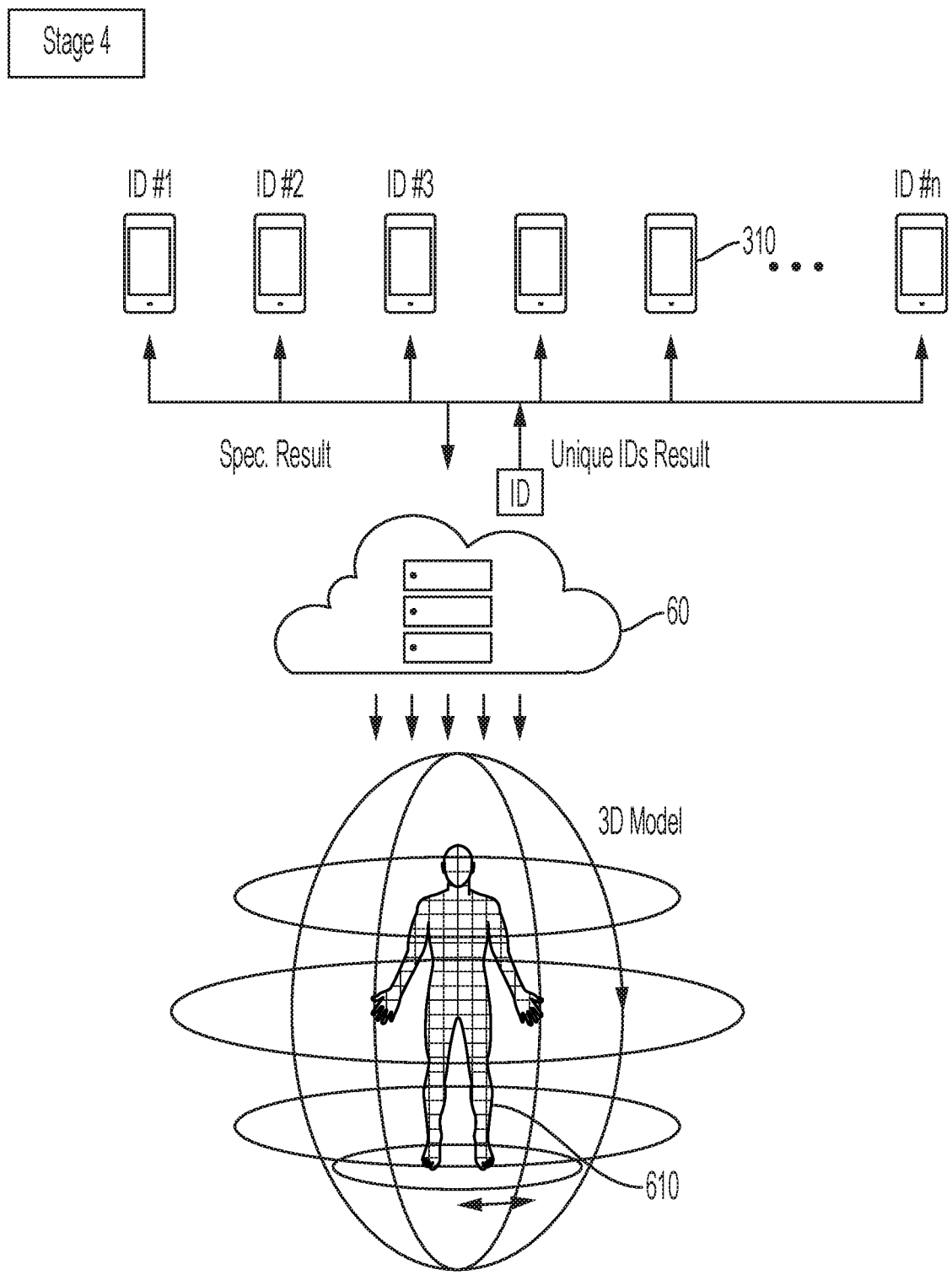
FIG. 7 is a schematic view of a result stage of a crowd scanning apparatus, computer program product, and/or method, in accordance with some embodiments of the present invention.

Once the images have been acquired, the operations (see FIG. 2) may continue with block 250 to process images of the subject 10. FIG. 7 is a schematic view of a result stage of a crowd scanning apparatus, computer program product, and/or method, in accordance with some embodiments of the present invention. Referring to FIGS. 2 and 7, the captured images 310 received from the respective image capture devices 30 of the scanners 20 are combined to generate the 3D model 610 (also referred to as "Stage 4").

As noted above, the external server 60 may make the scan complete once it has associated a timestamp TS and/or unique identification number ID with a particular segment 70 and/or physical location 72 around the periphery 40 of the subject 10. Once the external server 60 has determined that the scan is complete, the external server 60 may send, to each common application 32, the unique identification number ID that was associated with one of the segments 70 and/or physical locations 72 for that particular common application 32.

Upon receipt of the unique identification number ID, the common application 32 may transmit back the image 310 that is associated with the unique identification number ID. In some embodiments, the image 310 that corresponds to the unique identification number ID may be retrieved from a storage of the image capture device 30 by the common application 32, and transmitted to the external server 60. As discussed herein, in some embodiments, the external server 60 may associate multiple timestamps TS and/or unique identification numbers ID with a particular segment 70 and/or physical location 72. In such embodiments, the external server 60 may provide more than one unique identification number ID to the common application 32, and the common application 32 may transmit more than one associated image 310 back to the external server 60 in response.

By transmitting only the timestamp TS and/or unique identification number ID during the active image processing phase, the network traffic between the common application 32 and the external server 60 is reduced. As such, only those images 310 that will be used to generate the 3D model are transmitted between the common application 32 and the external server 60, though many more images 310 may have been captured by the image capture device 30.

When the external server 60 has received all of the images 310 from the common applications 32, the external server 60 may combine the images 310 together. In some embodiments, the external server 60 may then generate a 3D model 610 from the collection of images 310. The generation of a 3D model 610 from a plurality of 2D images is well-known and will not be described here for brevity.

Though the figures illustrate the generation of the 3D model 610 by the external server 60, it will be understood that the present invention is not limited thereto. In some embodiments, the generation of the 3D model 610 may be performed by an additional server. In such embodiments, the external server 60 may transmit the collected images 310 to the additional server and may receive the completed 3D model 610 as a response transmission from the additional server.

Figure 8:
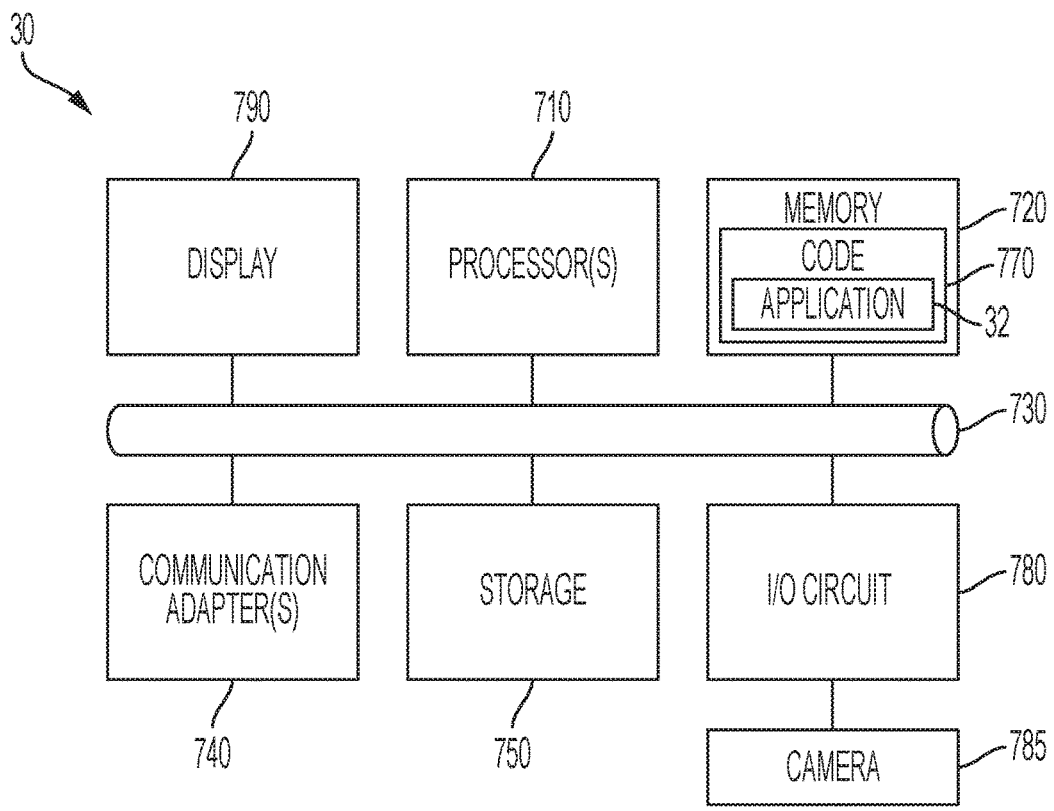
FIG. 8 is a block diagram of an image capture device configured to implement the present invention, according to various embodiments described herein.

FIG. 8 is a block diagram of an image capture device 30 configured to implement the present invention, according to various embodiments described herein. The image capture device 30 may use hardware, software implemented with hardware, firmware, tangible computer-readable storage media having instructions stored thereon, and/or a combination thereof, and may be implemented in one or more computer systems or other processing systems. The image capture device 30 may also utilize a virtual instance of a computer. As such, the devices and methods described herein may be embodied in any combination of hardware and software. In some embodiments, the image capture device 30 may be an embodiment of the image capture device 30 discussed herein with respect to FIGS. 2-7.

As shown in FIG. 8, the image capture device 30 may include one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 710 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 710 may be configured to execute computer program instructions from the memory 720 to perform some or all of the operations for one or more of the embodiments disclosed herein.

The image capture device 30 may also include one or more communication adapters 740 that may communicate with other communication devices and/or one or more networks, including any conventional, public and/or private, real and/or virtual, wired and/or wireless network, including, for example, Bluetooth, Zigbee, and/or the Internet. The communication adapters 740 may include a communication interface and may be used to transfer information in the form of signals between the image capture device 30 and another computer system or a network (e.g., the Internet). The communication adapters 740 may include a modem, a network interface (such as an Ethernet card), a wireless interface, a radio interface, a communications port, a PCM-CIA slot and card, or the like. These components may be conventional components, such as those used in many conventional computing devices, and their functionality, with respect to conventional operations, is generally known to those skilled in the art. In some embodiments, the communication adapters 740 may be used to transmit and/or receive data associated with the embodiments for creating the 3D model described herein.

The image capture device 30 may further include memory 720 which may contain program code 770 configured to execute operations associated with the embodiments described herein. Part of the program code 770 may include the common application 32 discussed herein. The memory 720 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 720 may also include systems and/or devices used for storage of the image capture device 30.

The image capture device 30 may also include one or more input device(s) such as, but not limited to, a mouse, keyboard, camera 785, a positioning device (e.g., a GPS or other location positioning device), and/or a microphone connected to an input/output circuit 780. The input device(s) may be accessible to the one or more processors 710 via the system interconnect 730 and may be operated by the program code 770 resident in the memory 720. The camera 785 may be used to acquire images for the generation of the 3D model, as discussed herein.

The image capture device 30 may also include a display 790 configured to generate a display image, graphical user interface, and/or visual alert. The display 790 may be accessible to the processor(s) 710 via the system interconnect 730. The display 790 may provide graphical user interfaces for receiving input, displaying intermediate operations/data, displaying notifications, and/or exporting output of the methods described herein.

The image capture device 30 may also include a storage repository 750. The storage repository 750 may be accessible to the processor 710 via the system interconnect 730 and may additionally store information associated with the image capture device 30. For example, in some embodiments, the storage repository 750 may contain position information, timestamps, unique information identification numbers, and/or captured images as described herein. Though illustrated as separate elements, it will be understood that the storage repository 750 and the memory 720 may be collocated. That is to say that the memory 720 may be formed from part of the storage repository 750.

Figure 9:
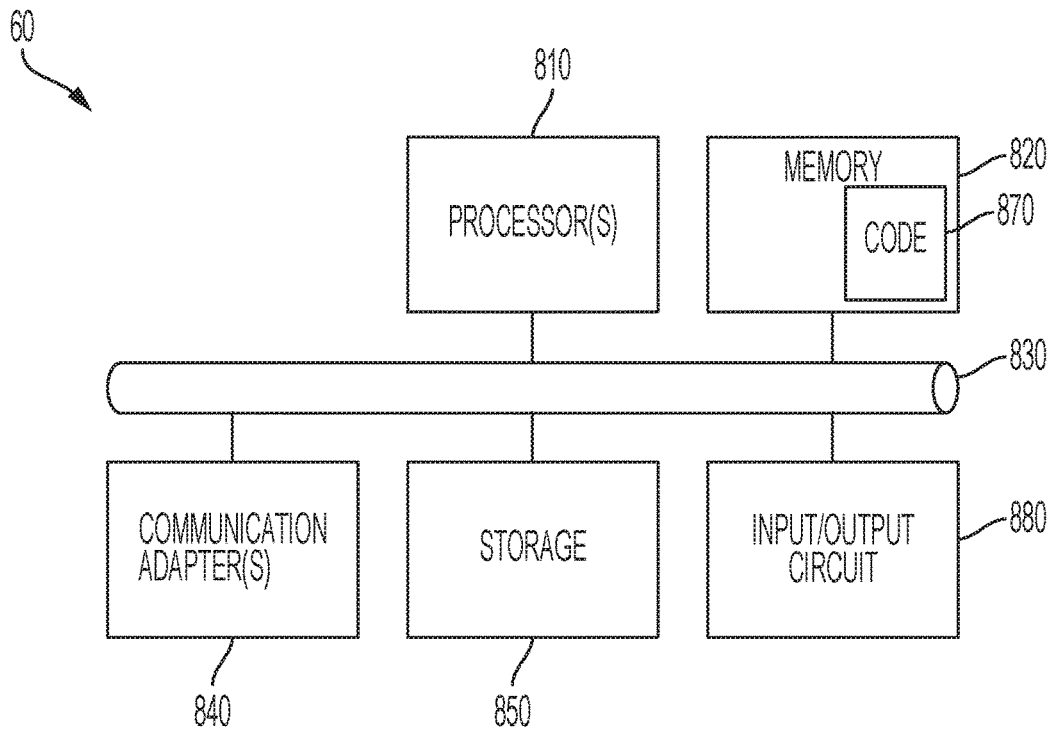
FIG. 9 is a block diagram of an external server configured to implement the present invention, according to various embodiments described herein.

FIG. 9 is a block diagram of an external server 60 configured to implement the present invention, according to various embodiments described herein. The external server 60 may use hardware, software implemented with hardware, firmware, tangible computer-readable storage media having instructions stored thereon, and/or a combination thereof, and may be implemented in one or more computer systems or other processing systems. The external server 60 may also utilize a virtual instance of a computer. As such, the devices and methods described herein may be embodied in any combination of hardware and software. In some embodiments, the external server 60 may be in communication with the image capture device 30 illustrated in FIG. 8.

As shown in FIG. 9, the external server 60 may include one or more processors 810 and memory 820 coupled to an interconnect 830. The interconnect 830 may be an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 810 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 810 may be configured to execute computer program instructions from the memory 820 to perform some or all of the operations for one or more of the embodiments disclosed herein.

The external server 60 may also include one or more communication adapters 840 that may communicate with other communication devices and/or one or more networks, including any conventional, public and/or private, real and/or virtual, wired and/or wireless network, including, for example, Bluetooth, Zigbee, and/or the Internet. The communication adapters 840 may include a communication interface and may be used to transfer information in the form of signals between the external server 60 and another computer system or a network (e.g., the Internet). The communication adapters 840 may include a modem, a network interface (such as an Ethernet card), a wireless interface, a radio interface, a communications port, a PCM-CIA slot and card, or the like. These components may be conventional components, such as those used in many conventional computing devices, and their functionality, with respect to conventional operations, is generally known to those skilled in the art. In some embodiments, the communication adapters 840 may be used to transmit and/or receive data (e.g., from an image capture device 30) associated with the embodiments for creating the 3D model described herein.

The external server 60 may further include memory 820 which may contain program code 870 configured to execute operations associated with the embodiments of the external server 60 described herein. For example, the program code 870 may be configured to communicate with a plurality of image capture devices 30 and receive information related to scans of a subject. The program code 870 may be configured to generate a 3D model from images received from the plurality of image capture devices 30 and/or may be configured to transmit the plurality of images to an additional server to generate the 3D model.

The memory 820 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 820 may also include systems and/or devices used for storage of the external server 60.

The external server 60 may also include one or more input device(s) such as, but not limited to, a mouse, keyboard, camera, and/or a microphone connected to an input/output circuit 880. The input device(s) may be accessible to the one or more processors 810 via the system interconnect 830 and may be operated by the program code 870 resident in the memory 820.

The external server 60 may also include a storage repository 850. The storage repository 850 may be accessible to the processor 810 via the system interconnect 830 and may additionally store information associated with the external server 60. For example, in some embodiments, the storage repository 850 may contain images, unique identification numbers, segment locations, etc. as described herein. Though illustrated as separate elements, it will be understood that the storage repository 850 and the memory 820 may be collocated. That is to say that the memory 820 may be formed from part of the storage repository 850.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method of obtaining a 3D model of a subject, the method comprising:
communicating with a plurality of image capture devices operated by a plurality of users to form a scanning group;
communicating with respective ones of the plurality of image capture devices of the scanning group to position the respective ones of the image capture devices around a periphery of the subject;
communicating with the plurality of image capture devices to identify a reference object on or near the subject, wherein the reference object comprises:
a surface;
a plurality of fiducials on the surface that are photogrammetrically analyzable; and
a plurality of reference markers on the surface that are recognizable by image processing software,
wherein the plurality of fiducials are on portions of the surface not occupied by the reference markers, and
wherein the plurality of fiducials comprise geometric patterns and lines and/or random patterns;
obtaining one or more captured images from respective ones of the image capture devices; and
generating the 3D model of the subject from the plurality of captured images.

2. The method of claim 1, wherein communicating with the plurality of image capture devices to form the scanning group comprises:
distributing an electronic invitation to the plurality of image capture devices over a network connection to a common application executing on each of the plurality of image capture devices; and
processing a user interaction by a respective user of a respective image capture device with the electronic invitation to add the respective image capture device to the scanning group.

3. The method of claim 2, wherein the electronic invitation comprises a QR code.

4. The method of claim 1, further comprising initiating a scanning session by sending an electronic notification to members of the scanning group.

5. The method of claim 1, wherein communicating with respective ones of the plurality of image capture devices of the scanning group to position the respective ones of the image capture devices around the periphery of the subject comprises communicating with a common application executing on each of the plurality of image capture devices, and further comprising providing directions via the common application for adjustment of the image capture device, wherein the adjustment of the image capture device comprises a physical adjustment of the image capture device, and wherein the directions comprise an indication displayed on the image capture device by the common application.

6. The method of claim 1, wherein a first image capture device of the plurality of image capture devices comprises a first operating system, and a second image capture device of the plurality of image capture devices comprises a second operating system, different from the first operating system.

7. The method of claim 1, further comprising communicating with the plurality of image capture devices to identify a reference point associated with the subject.

8. The method of claim 1, wherein obtaining the one or more captured images from the respective ones of the image capture devices comprises:
receiving a timestamp and a unique identification number from the respective image capture device; and
requesting a respective captured image from the respective image capture device based on the timestamp and the unique identification number.

9. The method of claim 1, wherein each of the plurality of image capture devices is independently operated by a respective user of the plurality of users of the scanning group.

10. A computer program product for obtaining a 3D model of a subject comprising:
a tangible non-transitory computer readable storage medium comprising computer readable program code embodied in the medium that when executed by at least one processor causes the at least one processor to perform operations comprising the method of claim 1.

11. A computing apparatus for obtaining a 3D model of a subject, the apparatus comprising:
a processor; and
a memory coupled to the processor and storing computer readable program code that when executed by the processor causes the processor to perform operations comprising the method of claim 1.

12. The method of claim 1, wherein the subject is standing on or within the reference object.

13. The method of claim 1, wherein the subject is holding the reference object.

14. The method of claim 1, wherein the reference object surface has a first color, and wherein the plurality of fiducials have a second color different from the first color.

15. The method of claim 1, wherein the reference object is a garment configured to be worn by the subject.

16. The method of claim 1, further comprising communicating with the plurality of image capture devices to use the reference object to identify a reference point associated with the subject.

17. A method of operating an image capture device to capture an image of a subject, the method comprising:
receiving an electronic invitation to join a scanning group;
communicating acceptance of the electronic invitation by a user of the image capture device;
receiving positioning directions to adjust a position of the image capture device around a periphery of the subject; and
transmitting a captured image of the subject to an external server, comprising:
transmitting a timestamp and a unique identification number associated with the captured image to the external server;
receiving a request from the external server comprising the unique identification number; and
responsive to the request comprising the unique identification number, transmitting the captured image to the external server.

18. The method of claim 17, further comprising receiving notification of a start of a scanning session, and providing time coordination data to the external server.

19. The method of claim 17, wherein receiving the positioning directions to adjust the position of the image capture device around the periphery of the subject comprises receiving an electronic instruction for an adjustment to the image capture device, wherein the adjustment of the image capture device comprises a physical adjustment of the image capture device, and wherein the method further comprises displaying an indication on a display of the image capture device.

20. The method of claim 17, further comprising automatically identifying a location of the subject and/or an angle from the image capture device to the subject.

21. A method of obtaining a 3D model of a subject, the method comprising:
- capturing a plurality of images of the subject by an image capture device;
- associating respective ones of the plurality of images with a timestamp and unique identification number;
- transmitting image capture data comprising the timestamp and the unique identification number to an external server;
- receiving a request from the external server comprising the unique identification number; and
- responsive to receiving the request comprising the unique identification number, transmitting a first image of the plurality of images that is associated with the unique identification number to the external server.

22. The method of claim 21, wherein transmitting the image capture data comprises transmitting a plurality of timestamps and a plurality of unique identification numbers, each of the plurality of timestamps and the plurality of unique identification numbers respectively associated with ones of the plurality of the images of the subject.

23. The method of claim 21, further comprising:
- transmitting first position data to the external server, wherein the first position data corresponds to a first physical location of the image capture device around a periphery of the subject;
- determining the first position data based on a fiducial marker on a reference target in proximity to the subject and/or on a reference garment of the subject; and
- receiving an indication from the external server that the first physical location of the image capture device should be changed to a second physical location, different from the first physical location.

24. The method of claim 21, further comprising:
- analyzing a second image of the plurality of images to identify a physical location corresponding to a reference point on the subject;
- determining a 3D coordinate for the physical location; and
- transmitting the 3D coordinate to the external server.

25. The method of claim 21, further comprising:
- electronically receiving an invitation to join a scanning group, wherein the invitation comprises a QR code.

* * * * *